United States Patent [19]

Nelson

[11] 4,238,710
[45] Dec. 9, 1980

[54] SYMMETRY REGULATED HIGH FREQUENCY BALLAST

[75] Inventor: Alan H. Nelson, Los Gatos, Calif.
[73] Assignee: Datapower, Inc., Santa Ana, Calif.
[21] Appl. No.: 973,617
[22] Filed: Dec. 27, 1978
[51] Int. Cl.³ .......................................... H05B 41/392
[52] U.S. Cl. .................................... 315/307; 315/224; 315/290; 315/DIG. 7; 323/22 T
[58] Field of Search .................. 315/209 R, 224, 225, 315/287, 289, 290, 307, 311, DIG. 5, DIG. 7; 363/20, 21; 323/22 T, DIG. 1

[56] References Cited

U.S. PATENT DOCUMENTS

| 3,486,070 | 12/1969 | Engel | 315/224 X |
|---|---|---|---|
| 3,906,302 | 9/1975 | Wijsboom | 315/289 X |
| 4,004,187 | 1/1977 | Walker | 315/205 |
| 4,039,897 | 8/1977 | Dragoset | 315/287 X |
| 4,121,136 | 10/1978 | Fournier et al. | 315/307 X |

Primary Examiner—Eugene R. LaRoche
Attorney, Agent, or Firm—Knobbe, Martens, Olson, Hubbard & Bear

[57] ABSTRACT

A gas discharge lamp is connected across an inductor and in series with a solid state switching device and a resistor, and this combination is connected across a voltage source. This switching device is controlled by a monostable multivibrator, the input of which is connected to the output of a comparator amplifier sensing the difference between the voltage drop across the above-mentioned resistor and a reference voltage which may be changed to vary light intensity. A supply voltage feedback control loop uses a power oscillator to maintain the voltage supplied to the inductor and the lamp at a level corresponding to a symmetrical voltage wave form in the lamp in order to maximize lamp efficiency. A reference voltage feedback control loop controls the reference voltage supplied to the comparator amplifier in order to minimize the effect of power line variations on lamp intensity while allowing controlled variations in intensity by the user. The supply voltage feedback control loop provides an input impedance to a 60-Hertz power source which is exclusively resistive and non-reactive, thereby maximizing efficiency of the power supply.

24 Claims, 33 Drawing Figures

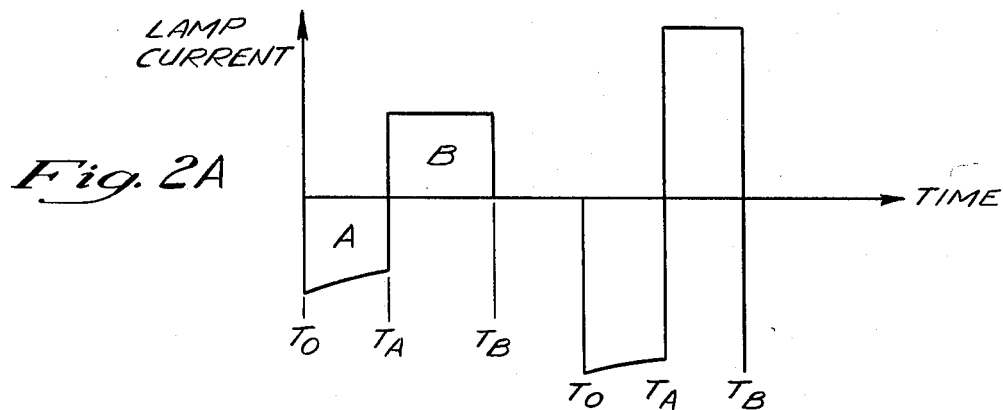
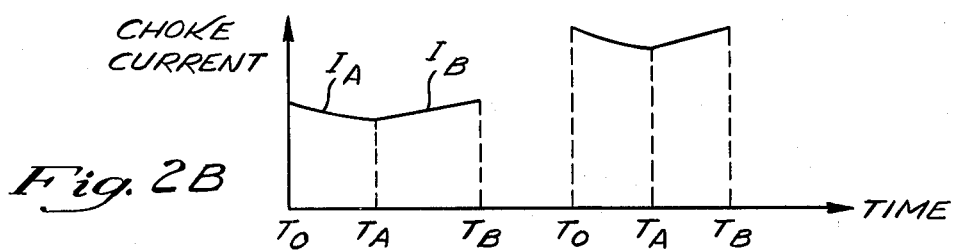
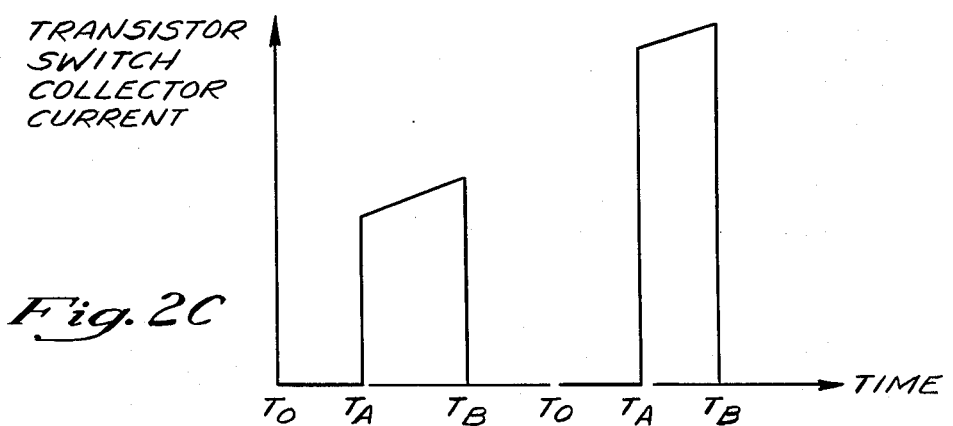
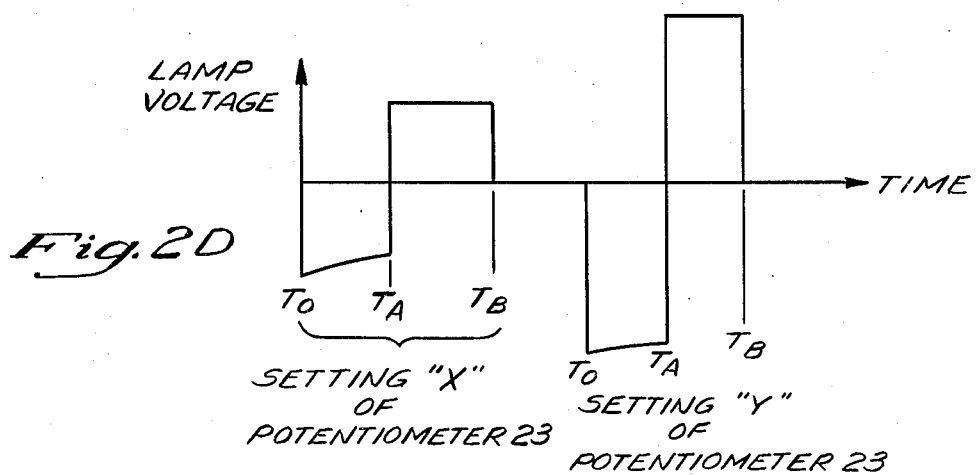

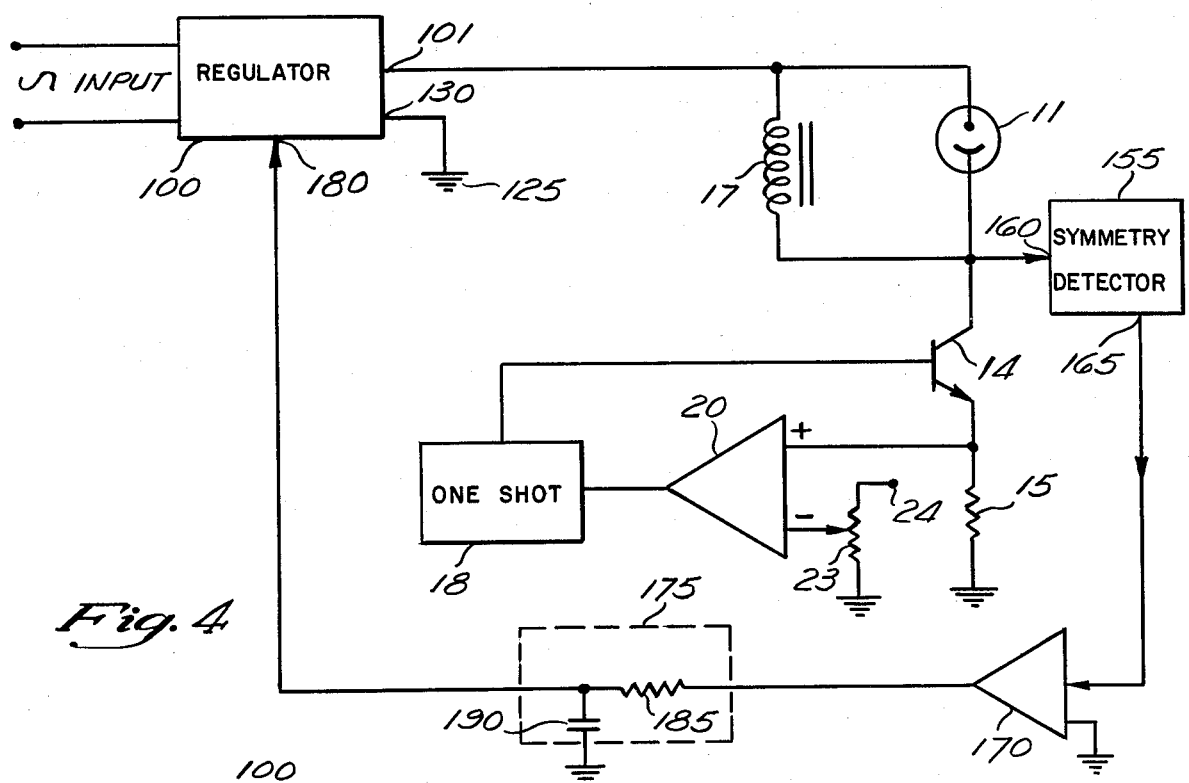
Fig. 4
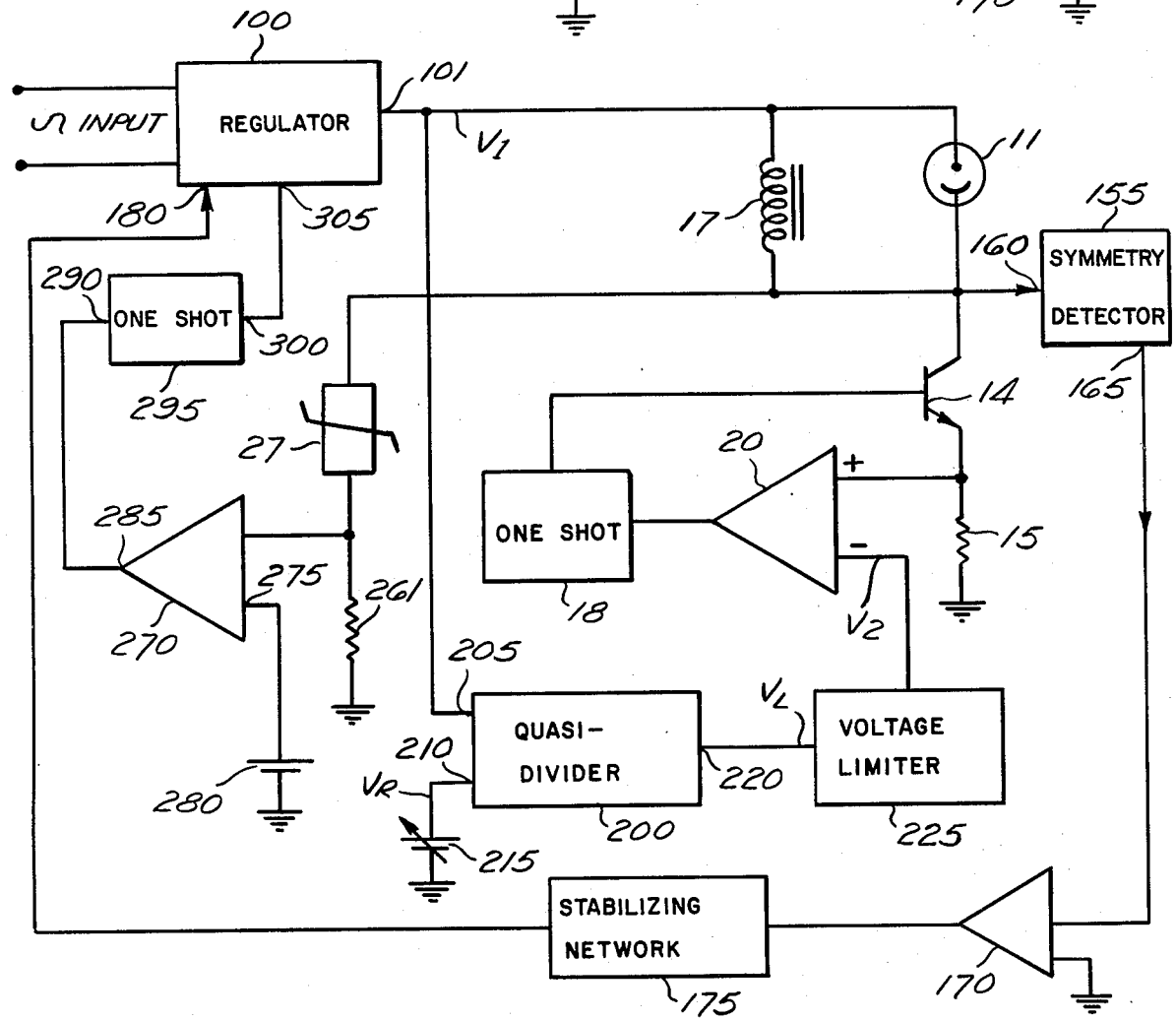

DIVIDER

CURRENT CONVERTER

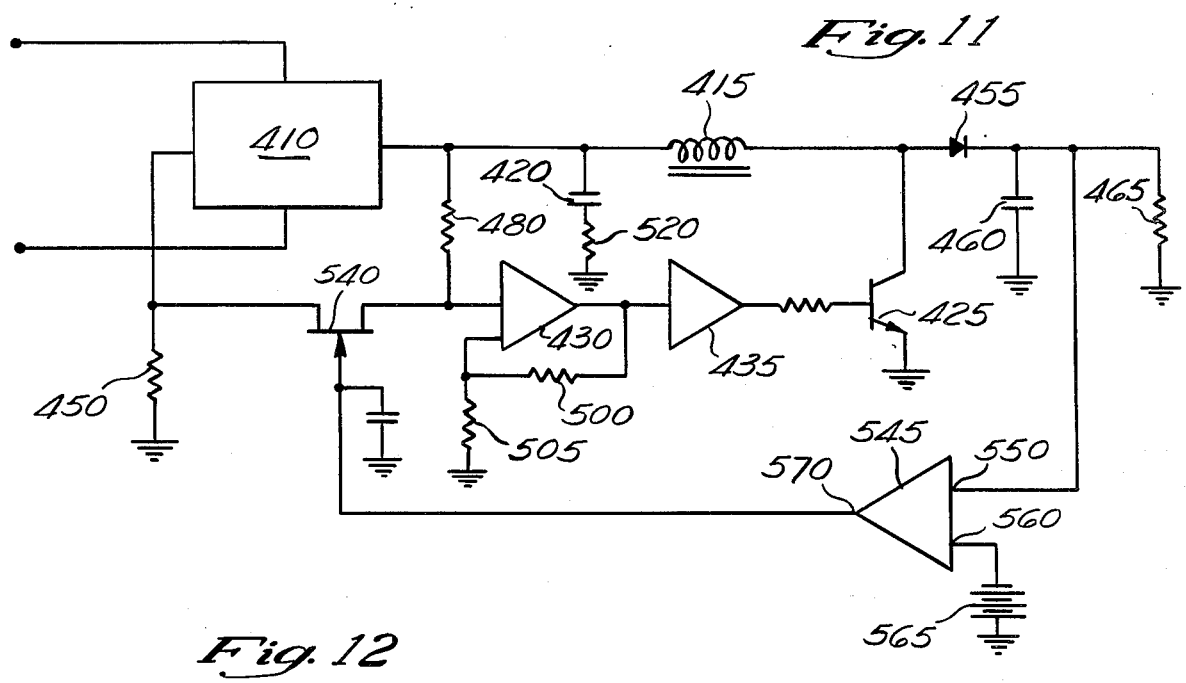

SYMMETRY REGULATED HIGH FREQUENCY BALLAST

BACKGROUND OF THE INVENTION

1. Field of the Invention

This invention relates to apparatus for operating a gas discharge lamp, such as a fluorescent light, a mercury vapor lamp, a sodium lamp, or a metal halide lamp.

2. Related Applications

This application discloses subject matter which is related to U.S. patent application Ser. No. 865,209, Filed Dec. 28, 1977, now U.S. Pat. No. 4,168,453, issued Sept. 18, 1979; Ser. No. 940,435, Filed Sept. 7, 1978; and Ser. No. 968,372, filed Dec. 11, 1978; all by Francis Henry Gerhard and Gerald Allen Felper; all for "VARIABLE INTENSITY CONTROL APPARATUS FOR A GAS DISCHARGE LAMP".

3. Description of the Prior Art

Control circuits for gas discharge lamps are known which obviate the need for the usual heavy and expensive series ballast devices, corresponding to the inductor in this device. In such circuits, switching elements are provided to periodically reverse the direction of current through the lamp to reduce the deterioration or errosion of electrodes, and to ensure a high enough frequency of switching to reduce the requirement for the size of the ballast. Such circuits generally require two switching elements for each direction of the current.

Attempts have been made to fabricate the same type of circuit using only a single switching element to cause current reversal in the lamp. For example, the U.S. Pat. to D. B. Wijsboom, No. 3,906,302, is directed to such an arrangement and incorporates an inductor in parallel with the lamp, which lamp is in series with a switching device. Such a switching device is generally operated at relatively high frequencies, such as 20 kHz.

One problem has been that the illumination intensity of the lamp for a given amount of power consumed is maximized only if the switching device operates to provide a symmetrical voltage wave form to the lamp. Typically, the magnitude of the voltage supplied to the circuit determines the shape of the voltage wave form supplied to the lamp. As a result, in general, there is a specific voltage which must be supplied to the circuit in order to provide a symmetrical voltage wave form to the lamp. The applicant has emperically found that the power efficiency of the lamp is maximized only when a symmetrical voltage wave form is supplied to the lamp, and that, for a high intensity mercury vapor lamp connected to a control circuit having a single switching element, a voltage supplied to the circuit of approximately 130 volts DC when warmed up, or 20 volts DC when cold, results in a symmetrical wave form. The problem of maximizing the efficiency of the lamp by providing a fixed supply voltage which ensures a symmetrical voltage wave form in the lamp is compounded because, if the control circuit is designed to provide the requisite 130-volt DC value for a symmetrical voltage wave form in the lamp after warm up, then the time require to warm up the lamp after initial turn-on would be extended to become excessively long, and it is even possible that the lamp, after initial turn-on, would never reach its normal operative mode.

Another problem is that, even though the control circuit may be designed to apply the requisite voltage to ensure a symmetrical voltage wave form in the lamp, the requisite voltage may change during the life of the lamp due to change in lamp characteristics, and is different from lamp to lamp due to manufacturing tolerance variations. Furthermore, changes in lamp characteristics may result in a change in load impedance presented to the power supply, which may cause a change in the voltage output of the power supply, further complicating the task of attempting to supply the requisite voltage required to ensure a symmetrical voltage wave form in the lamp. Furthermore, power loss in the power supply itself occurs if the power supply input impedance is reactive. Finally, even if the power supply is designed to provide the requisite voltage to the lamp for corresponding to a symmetrical voltage wave form in the lamp, variations in the voltage in the power line supplying power to the power supply may cause the power supply to vary its voltage output from the desired requisite voltage.

SUMMARY OF THE INVENTION

A gas discharge lamp is connected across an inductor. One end of the inductor is connected to a rectified power source and the other end is connected to the collector of a transistor switch. The emitter of the transistor is connected to one end of a resistor, and the other end of the resistor is connected to the power supply return. The base of the transistor is connected to the output of a monostable or one-shot multivibrator. The input to the one-shot multivibrator is connected to the output of a comparator amplifier. The multivibrator operates in such a way that when the input to the multivibrator is high, the multivibrator is triggered and its output goes low for a predetermined amount of time, after which its output returns to the high state. The two inputs to the comparator amplifier are connected in such a way that one input is connected to the emitter of the transistor and the other input is connected to a reference voltage which may be varied or controlled. The circuit components and the time delay of the multivibrator are chosen in such a way as to provide a relatively high rate of switching on the base of the transistor, approximately 20 to 40 kHz.

In this invention, the voltage wave form supplied to the lamp by the control circuit is symmetrical and the power efficiency of the lamp is maximized because the on-time of the transistor is equal to its off-time. The off-time is defined by the fixed time during which the multivibrator remains in its low output state. The on-time of the transistor is a function of the voltage supplied to the control circuit. One way of forcing the lamp voltage wave to be symmetrical would be to hold the on-time of the transistor to a constant value in the same manner that the off-time is held to a constant value so that the off- and on-times are equal. However, since the on-time is also affected by the reference voltage, this simple solution would not permit the user to vary the illumination intensity of the lamp by varying the reference voltage, and as discussed above, such a constant voltage would not provide adjustment for changes in lamp characteristics. In this invention, a supply voltage feedback control loop including a power oscillator and a symmetry detector uses the output of the symmetry detector to control the voltate supplied to the control circuit so that it is maintained at a value which causes the on-time of the transistor to equal its off-time, resulting in a symmetrical voltage wave form supplied to the lamp, maximizing the efficiency of the lamp. In order to prevent variations in lamp intensity caused by variations in power line voltage, this invention uses a reference voltage feedback control loop to control the reference voltage supplied to one input of the comparator amplifier which minimizes variations in lamp intensity due to variations in power line voltage, while permitting the controlled variation of the reference voltage by the user in order to vary lamp intensity in a desired manner. The supply voltage control feedback loop and the reference voltage control feedback loop are combined in a voltage regulator which is connected between the lamp control circuit and a constant current source providing 60-Hertz alternating current. The voltage regulator provides further improvements in the efficient use of power by the lamp and its associated apparatus by presenting an input impedance to a 60-Hertz power source which is non-reactive, a feature facilitated by the power oscillator of the supply voltage feedback control loop. A shut-down circuit is provided to temporarily shut down the voltage regulator before the occurrence of an over-voltage condition in order to protect certain components in the circuit.

The advantages of this invention are immediately apparent in that the supply voltage feedback control loop will always assure a symmetrical voltage wave form supplied to the lamp even if lamp characteristics change during the life of the lamp and even if different lamps are substituted having different characteristics, without necessitating any changes in the parameters of the components of the voltage regulator and control circuit of this invention. Thus, the efficient use of power for a given illumination intensity in the lamp is maximized because the voltage wave form supplied to the lamp is constrained to be symmetrical and because the voltage regulator presents an average input impedance to the power line which is non-reactive, thereby substantially eliminating reactive power losses in the voltage regulator.

BRIEF DESCRIPTION OF THE DRAWINGS

The invention will be described in detail with reference to the accompanying drawings in which:

FIG. 2 shows four wave form plots labeled 2A, 2B, 2C, and 2D which are characteristic of the prior art control circuit illustrated in FIG. 1;

FIG. 2A is a plot of the current through the gas discharge lamp as a function of time, FIG. 2B is a plot of the current through the choke or inductor as a function of time, FIG. 2C is a plot of the collector current of the transistor as a function of time, and FIG. 2D is a plot of the voltage across the gas discharge lamp as a function of time. In all of these plots, time is plotted on the horizontal axis and the voltage or current is plotted on the vertical axis;

FIG. 4 is a schematic diagram of an embodiment of this invention which includes a symmetry regulated supply voltage feedback control loop;

FIG. 5 illustrates time domain plots of the choke current and lamp voltage wave forms, similar to the wave forms of FIGS. 2B and 2C, respectively, and showing by way of comparison the effect of the introduction of the symmetry regulated feedback control loop of FIG. 4, in which:

FIG. 6 is a schematic diagram of another embodiment of this invention including the symmetry regulated control loop of FIG. 4 and further including a selective current regulating control loop and a protective shut-down circuit;

FIG. 9 includes time domain plots of various voltage and current wave forms in the circuit illustrated in FIG. 8 wherein:

FIG. 10 includes time domain plots of voltage and current wave forms in the power oscillator of FIG. 8, wherein:

FIG. 11 is a schematic diagram of the voltage regulator of this invention which includes the current convertor of FIG. 8;

FIG. 12 is an overall schematic block diagram of the preferred embodiment of this invention including the symmetry regulated control loop of FIG. 4, the current regulator control loop of FIG. 6, a protective shutdown circuit similar to that illustrated in FIG. 6, and the voltage regulator of FIG. 11;

PRIOR ART CONTROL CIRCUITS

Figure 1:
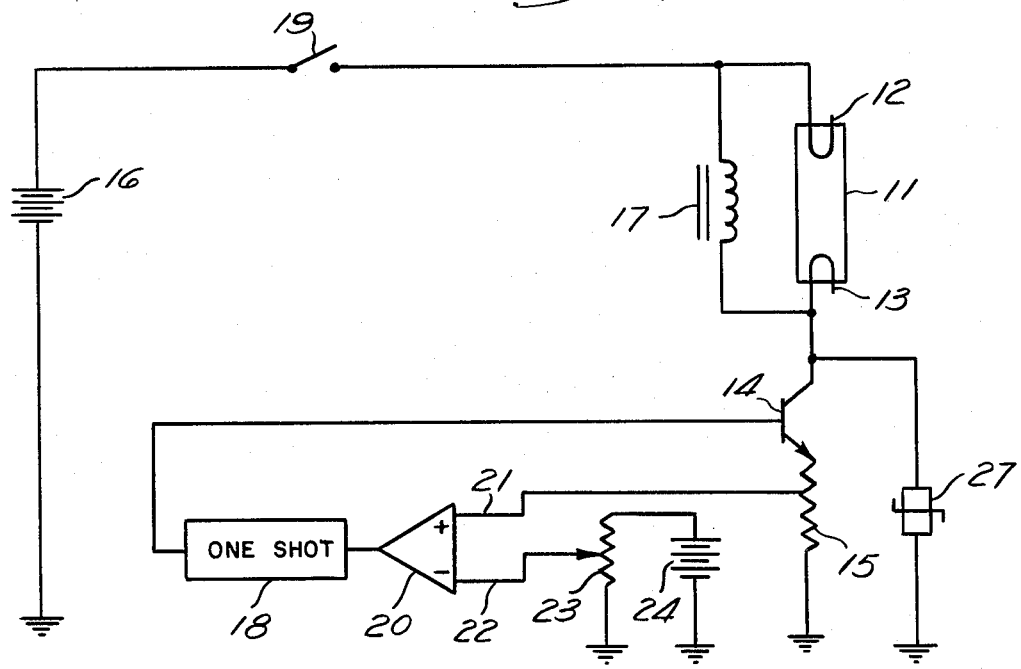
FIG. 1 illustrates a prior art control circuit for a gas discharge lamp shown in simplified form for facilitating an understanding of the overall function of the control apparatus.
Figure 3:
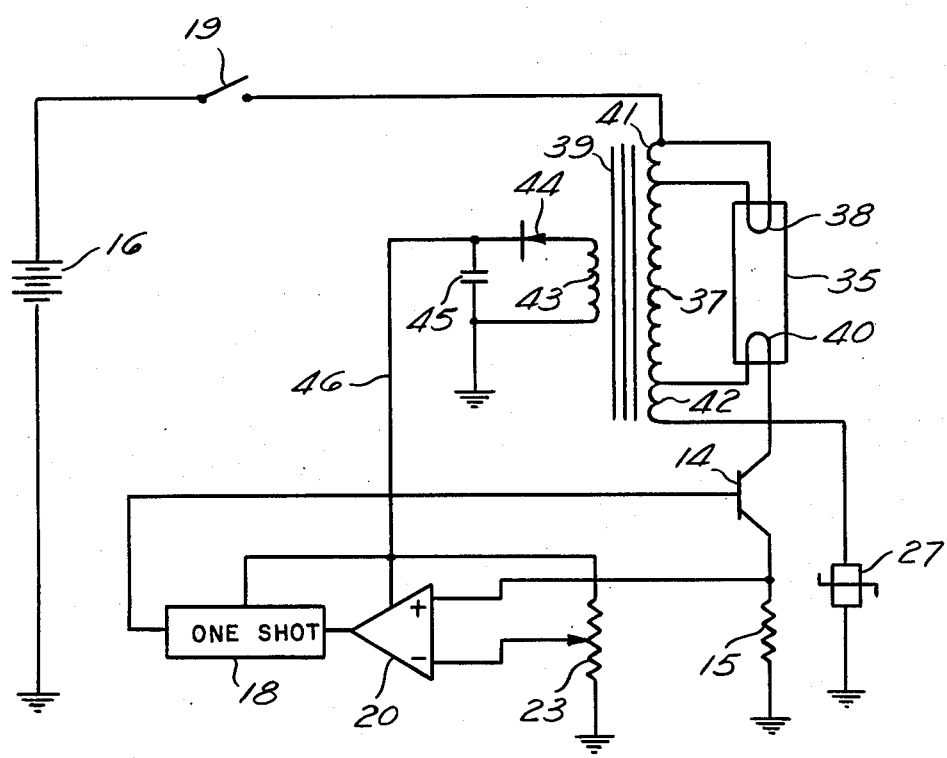
FIG. 3 illustrates a modified form of the prior art control circuit of FIG. 1.

The prior art control circuits illustrated in FIGS. 1 and 3 form a basis for this invention. Therefore, a description of these prior art circuits is included herein for the sake of clarity.

Referring to the prior art circuit illustrated in FIG. 1, a gas discharge lamp 11, typically a low-pressure mercury vapor fluorescent lamp, having two electrodes 12 and 13, has its electrode 13 connected to an electronic switch shown as an NPN transistor 14, the collector of which is connected to electrode 13, and the emitter connected to a resistor 15. The other end of the resistor 15 is connected to ground. The other electrode 12 of the gas discharge lamp 11 is connected to a DC power supply. This supply will normally be a rectified AC source but is shown for simplicity in this figure as a battery 16 whose positive terminal is connected through on-off switch 19 to electrode 12 and whose negative terminal is connected to ground. A choke or inductor 17 is connected in parallel with the electrodes of the gas discharge lamp 12 and 13.

The base of the NPN transistor switch 14 is connected to the output of a one-shot multivibrator 18. The monostabile multivibrator operates in such a way that when the input to the multivibrator is low its output is high, and when its input is high, the monostabile multivibrator is triggered such that its output goes into the low state for a predetermined finite length of time, after which the output of the multivibrator returns to the high state. The input of the multivibrator is connected to the output of a comparator amplifier 20. The positive input of the comparator amplifier is connected through a conductor 21 to the emitter of the NPN transistor 14, and the negative input of the comparator amplifier is connected through a conductor 22 to a potentiometer 23. Potentiometer 23 is connected to the positive end of a DC power source 24, and the negative end of the DC power source 24 is connected to ground.

The operation of the circuit of FIG. 1 is as follows. When the switch 19 is first closed, the current passes through the switch 19 and through the inductor 17. No current passes through the gas discharge lamp 11 because, until it is ignited by high voltage, the lamp remains nonconductive. The current through the inductor passes through the NPN transistor switch 14 and through the resistor 15 to ground. The current through the inductor 17 rises as a function of time until it reaches a level at which the voltage drop across the resistor 15 exceeds the voltage on the conductor 22. The voltage on the conductor 22 is determined by the potentiometer 23. When the voltage drop across the resistor 15 exceeds the voltage on the conductor 22, the comparator amplifier 20 senses a positive difference between its inputs and the output of the comparator amplifier 20 changes from the low to the high state. In response to the high output of the comparator amplifier 20, the one-shot multivibrator 18 is triggered and provides a low output for a short predetermined length of time. Thus, the transistor switch 14 will be turned off for the short period of time during which the base of the transistor receives a low level signal from the multivibrator 18. The magnetic field in the choke 17 then collapses, resulting in a flyback voltage potential across the electrodes 12 and 13 of the gas discharge lamp 11. This potential is sufficient to ignite the lamp and the lamp begins to conduct current. The flyback voltage is also applied to the collector of the transistor 14.

After the above-mentioned short predetermined length of time, the one-shot multivibrator output returns to its normally high level state, thereby turning the transistor switch 14 back on. At this instance in time, current begins to flow from the source 16 through the electrodes 12 and 13 of the gas discharge lamp 11 in the opposite direction to the current supplied before by the choke 17. The magnetic field in the choke 17 also begins to build up again as does the current through the choke 17. This results in a rise in the collector current of the transistor 14 and an equal rise in current through the resistor 15. This rise in current will cause the voltage drop across resistor 15 to rise until the voltage on the conductor 21 again exceeds the voltage on conductor 22. Again, the comparator amplifier 20 will give a high output when this condition is reached, causing the output of the multivibrator 18 to go into the low state for the finite period of time thereby turning off the collector current of the transistor 14. The magnetic field in the choke 17 will collapse at this time, thereby causing a current to flow between the electrodes 12 and 13 of the gas discharge lamp 11 in a direction opposite to the direction traveled by the current when the transistor 14 was on. This condition will continue until the multivibrator output returns automatically to the high state.

As may be seen from this description, this process will continue to repeat itself as the transistor 14 continuously is switched on and off until steady state conditions are achieved. One or more cycles of operation may be required to ionize the lamp and cause it to ignite.

A varistor or high voltage zener diode 27 is connected between the collector of the NPN transistor and ground, and serves to protect the transistor 14 from destructive breakdown in the event of lamp failure causing an open circuit between its terminals, or inadvertent unplugging of the lamp when the power switch 19 is closed. When the lamp itself is defective and causes an open circuit or when the lamp is removed, the voltage rise at the collector of transistor 14 produced by collapse of the magnetic field in the inductor 17 will be limited to the breakdown voltage of the varistor, a value selected to be within the safe limits of the collector-base junction of the transistor switch 14.

A significant feature of this prior art control circuit is that the varistor 27 serves the additional function of preventing ignition of the lamp until the lamp electrodes have been warmed up over a time period which is long compared to the operating period of the control circuit. Thus, the prior art control circuit, without the varistor, would typically supply on the order of 1,000 volts across the lamp in the flyback mode. Such high voltage applied to the lamp filaments when they are cold would be extremely deleterious since the electrodes would undergo a very high rate of change of temperature. The varistor is selected such that it breaks down for voltages exceeding 500 to 600 volts. At these lower voltages, the lamp 11 will not ignite until after the cathodes have been heated. Typically, a time delay of $\frac{3}{4}$ second to one second is the amount of time needed to heat up the cathodes sufficiently for the lamp to ignite when supplied with 500 to 600 volts.

FIGS. 2A, 2B, 2C, and 2D are plots of the steady state response characteristics of the prior art circuit of FIG. 1 for two different levels of input power to the gas discharge lamp.

FIG. 2A is a plot of a single cycle of current through the gas discharge lamp as a function of time. The current is plotted on the vertical axis and the time is plotted on the horizontal axis. It will be understood that the current alternates through the lamp in a repetitive cycle. In the region of FIG. 2A, denoted "A", the transistor switch 14 is in the off state and the collapsing field in the inductor 17 is forcing a current through the gas discharge lamp. The region A covers a period of time between time $T_O$ and time $T_A$. This time period is equal to the unstable period of multivibrator 18. In the region in FIG. 2A denoted "B", the transistor switch 14 is on. The region B lies between the time $T_A$ and the time $T_B$, after which the cycle repeats itself.

In FIG. 2A, the magnitude of the lamp current in region A is shown to be roughly equal to the magnitude of the current in region B. Since, for reasons described above, there is no net DC current through the lamp, the respective areas under the curves in regions A and B are equal. Thus, in the circuit operating mode illustrated by FIG. 2A, the duration of the time periods A and B are roughly equal. The operational mode shown in FIG. 3A having approximately equal current flows in regions A and B is advantageous since it maximizes the efficiency of the lamp and also minimizes the current handling requirements for the switch transistor 14. This operating mode is achieved for a fairly narrow range of DC voltage output of the power source 16 for a given lamp.

FIG. 2B is a plot of the current through the choke or inductor 17 as a function of time. The current through the choke is plotted on the vertical axis, while time is plotted in the horizontal axis. In the region of FIG. 2B denoted "A", at time $T_O$, the transistor has been turned off and the current through the choke in the region of FIG. 2B denoted "B" increases until time $T_B$, at which time the transistor is turned back off, and the cycle repeats itself. The behavior of the circuit thus alternates between the behavior plotted in region A and the behavior plotted in region B.

FIG. 2C is the plot of the collector current of the transistor plotted as a function of time. The collector current amplitude is plotted on the vertical axis and time is plotted on the horizontal axis. In the region denoted A of FIG. 2C, the transistor is off and therefore the collector current remains zero, from time $T_O$ to the end of region A at time $T_A$. In the region denoted B in FIG. 2C, at time $T_A$, the transistor is turned on and remains on until time $T_B$, which defines the end of region B. During this time, the collector current continually increases. At time $T_B$ the transistor is again turned off and the process repeats itself. Thus, the collector current is periodic in time. The current level indicated by the plot is equal to the voltage on the conductor 22 of FIG. 1 divided by the resistance of the resistor 15 in FIG. 1.

FIG. 2D is a plot of the voltage across the gas discharge lamp as a function of time. It is identical in shape to the lamp current shown in FIG. 2A at the operating frequency of the circuit, i.e., the frequency at which the transistor switch 14 is switched on and off. This frequency is chosen so that its period is short compared to the ionization time of the lamp. A representative operating range is from between 20 to 40 kHz. At this high frequency, the lamp appears electrically to be a resistor. Since the current through a resistor is linearly proportioned to the voltage across it, the lamp voltage and current wave forms are identical in shape.

The prior art control circuit of FIG. 1 has the significant advantage that the weight of the choke, shown in FIG. 1 as 17, may be considerably reduced below the weight of the typical chokes found in the usual fluorescent lamp circuits using 60-Hz AC sources. By way of specific example, a choke suitable for use at 20 kHz will weigh on the order of 4 or 5 ounces whereas the corresponding choke for use at 60 Hz will weigh 4 or 5 pounds.

A feature of the prior art control circuit of FIG. 1 is that a selectively variable control over lamp intensity may be provided by the potentiometer 23. The power input to the lamp (and the resultant lamp intensity) are approximately proportional to the average magnitude of the lamp current, which is plotted in FIG. 2A. This plot shows the current reversal during periods when the transistor is turned off, which occurs, for example, at time $T_B$.

Assume that at a particular setting "X" of the potentiometer 23 in FIG. 1, the voltage on conductor 22 in FIG. 1 is lower than the voltage on the conductor at another setting "Y" of the potentiometer 23. The corresponding changes in the waveforms in FIGS. 2A, 2B, 2C, and 2D between the two settings of the variable resistor for effecting different levels of the lamp intensity are illustrated in these figures. In each figure, the waveform on the left represents setting X and the waveform on the right in each figure represents setting Y.

The manner in which this control is achieved with potentiometer 23 is as follows.

The peak lamp current always occurs whenever the transistor is turned off, corresponding to times $T_O$ and $T_B$. This occurs whenever the sum of the choke current and lamp current passing through the resistor, denoted 15 in FIG. 1, causes a voltage drop across this resistor equal to the voltage on the conductor, denoted 22 in FIG. 1. As stated above, this occurrence causes the comparator amplifier, 20 in FIG. 1, to give a positive output to the multivibrator, which in turn causes the multivibrator to turn the transistor off.

The current passing through the resistor, 15 in FIG. 1, is the collector current of the transistor. This current is plotted in FIG. 2C, as the sum of the lamp current and choke current in region B.

The peak collector current level is equal to the voltage on the conductor 22 in FIG. 1 divided by the resistance of the resistor, 15 in FIG. 1. When the voltage on the conductor 22 is increased or decreased, the collector current peak level will increase or decrease, respectively. Because the decay time of the current between time $T_O$ and time $T_A$ is always the same, the minimum value of the collector current will also increase or decrease, respectively. Thus, the entire waveform of the collector current will be shifted either up or down, respectively, of which two exemplary waveforms are plotted for the two different potentiometer settings X and Y. The waveforms of the choke current and the lamp current will also be shifted up or down respectively, as shown. This effect is the result of the fact that the collector current through the transistor is the sum of the choke current and lamp current, and the fact that the lamp current is proportional to the choke current.

Thus, it may be seen that the lamp intensity, which is proportional to lamp current, is proportional to the voltage on the conductor 22. By changing the resistance of the potentiometer 23 in FIG. 1, the current supplied to the lamp 11 will change.

Another feature of the prior art control circuit of FIG. 1 is that the useful life of the gas discharge lamp is increased since the net DC component of current through the lamp during continued operation is approximately zero. This is achieved by virtue of the parallel inductance which has the property of maintaining a zero DC voltage drop across its terminals. Since this zero DC voltage is also maintained across the lamp, the DC current through the lamp will also be zero.

FIG. 3 illustrates a modified embodiment of the prior art control circuit of FIG. 1 in which a gas discharge lamp 35, typically a low pressure mercury vapor fluorescent lamp of approximately 22 watts, is provided. The electrodes 38 and 40 are of the heated type. Power is derived from a DC voltage source 16.

An inductor 37 is connected in series with the transistor 14 and resistor 15 across the power supply 16. The electrodes 38 and 40 of lamp 35 are tapped into sections 41 and 42 of the winding of inductor 37 to preheat such electrodes prior to ignition of the lamp.

The inductor 37 also acts as the primary winding of a transformer and has an iron core 39 and a step-down secondary winding 43 associated therewith. The winding 43 is connected in circuit with a diode 44 across a capacitor 45. The diode 44 is also connected through line 46 to the power input terminals of the comparator amplifier 20 and multivibrator 18. It is also used to supply the reference voltage to the potentiometer 23.

The sections 41 and 42 of the winding of inductor 37 enable the electrodes 38 and 40 to become heated before the lamp is ignited. This arrangement maximizes electrode life and prevents damage to the electrodes 38 and 40 due to the otherwise excessive rise of temperature at the start of a lamp operation.

The polarity of the winding 43 is preferably such that the capacitor 45 is charged only when the transistor 14 is conducting. This arrangement insures that the particular voltage on capacitor 45 is independent of the variable flyback voltage developed by the inductor 37 when the transistor 14 is cut off.

These prior art control circuits are particularly suited for use with low intensity, low pressure mercury vapor fluorescent lamps. However, when used to control various other types of gas discharge lamps such as high pressure mercury vapor, high or low pressure sodium, and metal Halide lamps, significant problems may arise.

Description of the Symmetry Regulation

Referring to FIG. 2D, it should be recognized that if the time interval between $T_O$ and $T_A$ is equal to the time interval between $T_A$ and $T_B$, the voltage wave form supplied to the lamp, illustrated in FIG. 2D, will have a generally symmetrical form. It has already been seen that the time interval between $T_O$ and $T_A$ is determined by the time delay of the one-shot multivibrator 18 during which it remains in its low output state before switching to its high output state. The time interval between $T_A$ and $T_B$ is a function of the voltage supplied to the control circuit from the voltage source 16. Thus, if a symmetrical voltage wave form is to be supplied to the lamp 11, the voltage source 16 must supply a voltage having a magnitude which causes the time interval between $T_A$ and $T_B$, illustrated in FIG. 2D, to be equal to the fixed time interval between $T_O$ and $T_A$ defined by the low output state of the multivibrator 18. If the lamp 11 in FIG. 1 is a high intensity mercury vapor gas discharge lamp and a control circuit similar to the simplified circuit illustrated in in FIG. 1 is employed, it has been found that a voltage supplied by the source 16 equal to 130 volts will cause a symmetrical voltage wave form to be supplied to the lamp 11 in which the time interval between $T_O$ and $T_A$ is equal to the time interval between $T_A$ and $T_B$ and the lamp voltage wave form as illustrated in FIG. 2D.

It is apparent that an obvious technique for providing a symmetrical voltage in the lamp 11 of FIG. 1 is to select a voltage source 16 which provides an output voltage of 130 volts DC. However, as illustrated in FIG. 2D, the symmetry or assymetry of the voltage wave form supplied to the lamp is not only a function of the magnitude of the voltage supplied by the source 16, but is also a function of the voltage supplied by the potentiometer 23 as a reference voltage to the comparator 20. Thus, even though the voltage from the source 16 will provide a symmetrical voltage wave form in the lamp 11 for one setting of the potentiometer 23, such as setting "Y" of FIG. 2D, changing the potentiometer 23 to another setting, such as setting "X" of FIG. 2D, will alter the lamp voltage wave form so that it is no longer symmetrical. Therefore, using this simplified technique, the symmetrical voltage wave form cannot be maintained if the setting of the potentiometer 23 is to be permitted to change.

Another problem is encountered when the lamp 11 is a high intensity mercury vapor discharge lamp. If the voltage source 16 supplies the requisite 130 volts which results in the control circuit providing a symmetrical voltage wave form in the lamp 11, when the switch 19 is first closed and the lamp 11 is cold, the mercury vapor in the lamp 11 ionizes very rapidly so as to cause a voltage drop across the resistor 15 sufficient to cause the multivibrator 18 to change state to turn off the transistor 14 prematurely before the current through the inductor 17 has increased sufficiently. As a result, the warm-up period of the lamp 11 may be extended, and it is even possible that the lamp 11 and the associated control circuit will never reach the normal operating mode. This is a result of the fact that the voltage corresponding to a symmetrical wave form in the high pressure mercury vapor lamp, or symmetry voltage $V_s$, is 130 volts when the lamp is warm but only 20 volts when the lamp is cold. Thus, the symmetry voltage changes as the lamp temperature changes during the entire time that the switch 19 is closed. Therefore, a single supply voltage from the source 16 will not always provide a symmetrical voltage wave form within the lamp. Furthermore, even if the magnitude of the voltage supplied by the source 16 is selected to equal the symmetry voltage of the lamp when warmed up, the lamp characteristics may change during the life of the lamp; or, if the lamp is itself exchanged for another lamp, the voltage supplied by the source 16 will no longer be the requisite symmetry voltage.

If, on the other hand, symmetry is imposed by holding the on time of transistor 14 to a constant value, for example, by use of a bi-stable multivibrator having fixed "on" and "off" time periods which are equal, it would no longer be possible to vary or select the lamp illumination intensity in the manner described above in connection with FIG. 1.

FIG. 4 is a simplified schematic diagram of an embodiment of this invention in which the foregoing problems are solved. A voltage regulator 100 supplies voltage to the gas discharge lamp 11 connected in parallel across an inductor 17. The parallel combination of the lamp 11 and inductor 17 is connected in series with a transistor 14 and a resistor 15 which is connected through ground to the voltage regulator return 130. A comparator amplifier 20 and an astable multivibrator 18 are connected between the transistor 14 and the resistor 15 in the same manner as discussed above in connection with FIGS. 1 and 3. The comparator 20 receives a reference signal from a reference voltage source 24 connected across a potentiometer 23. This invention includes the novel feature of a symmetry detector 155 having its input 160 connected to the collector of the transistor 14 and its output 165 connected through an amplifier 170 and a stabilizing network 175 to a feedback reference input 180 of the voltage regulator 100. The symmetry detector 155, the amplifier 170, the stabilizing network 175, and the feedback reference input 180 form a supply voltage feedback control loop which maintains the supply voltage at the lamp 11 at the symmetry voltage $V_s$. The symmetry detector is a circuit that produces a DC voltage at its output 165 proportional to the difference between the on-time of the transistor 14, corresponding to the interval between $T_A$ and $T_B$ of FIG. 2, and the off-time of the transistor 14, corresponding to the time interval between $T_O$ and $T_A$ of FIG. 2. Therefore, in one embodiment the output 165 of the symmetry detector 155 is positive if the on-time of the transistor 14 exceeds its off-time while the output 165 of the symmetry detector 155 is negative if the on-time of the transistor 14 is less than its off-time.

The stabilizing network 175 is included in the feedback loop to achieve stability against oscillation. It may be a simple low-pass filter including a resistor 185 and a capacitor 190.

The operation of the feedback loop controls the output voltage $V_1$ of the voltage regulator 100 to be at or near the symmetry voltage $V_s$, which causes the on and off times of the transistor 14 to be equal, corresponding to a symmetrical voltage wave form to the lamp 11. A description of the operation of the feedback loop may begin with an assumption that the voltage $V_1$ supplied by the voltage regulator 100 to the lamp 11 is greater than the requisite symmetry voltage $V_S$, causing the on-time to be shorter than the off-time of transistor 14. This would cause the output 165 of the symmetry detector 155 to be negative. This negative output of the symmetry detector is amplified by the amplifier 170 and the resulting voltage is then applied to the feedback reference input 180 of the voltage regulator 100 as negative feedback. The voltage regulator 100 responds to this negative feedback by reducing voltage $V_1$ at the output 101 of the voltage regulator 100. For very high loop gains, the voltage supplied to the lamp 11 will be reduced by feedback from the symmetry detector 155 until it equals $V_S$, at which time the output of the symmetry detector 155 will approach zero. At this point, a symmetrical voltage wave form will be applied to the lamp 11. It should be apparent that, while the symmetry voltage $V_S$ may change due to temperature changes in the lamp 11 or due to aging of the lamp 11, the symmetry detector 155 will cause the voltage supplied to the lamp to be maintained at or near the symmetry voltage $V_S$, regardless of variations in $V_S$. The stabilizing network 175 prevents rapid changes in the feedback signal provided by the amplifier 170, thus increasing the stability of the supply voltage feedback control loop.

The effect of the symmetry regulation loop of FIG. 4 is best seen by reference to the time domain plots of the current through the choke 17 in FIG. 5. FIGS. 5A and 5C are time domain plots of the choke current in the absence of symmetry regulation in a control circuit such as the circuit illustrated in FIG. 1. The plots of FIGS. 5A and 5C are for two settings, "X" and "Y", respectively, of the potentiometer 23 of FIG. 1, and these plots are seen to correspond to the two time domain plots of FIG. 2B. The effect of the introduction of symmetry regulation into the circuit is illustrated in FIGS. 5B and 5D. FIG. 5B is a time domain plot of the symmetry regulated choke current for the setting "X" of the potentiometer 23 in the circuit of FIG. 4 corresponding to the setting "X" of potentiometer 23 in FIG. 1 and FIG. 5D is a time domain plot of the symmetry regulated choke current for setting "Y" of potentiometer 23 in the circuit of FIG. 4 corresponding to the setting "Y" of potentiometer 23 in FIG. 1.

Figure 5A:
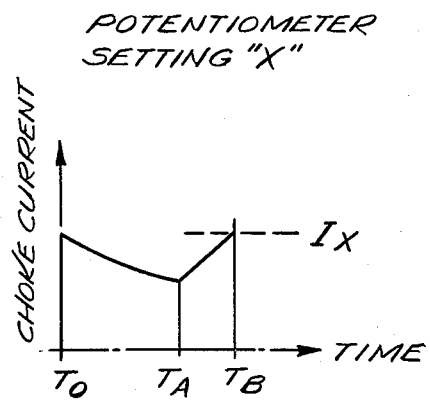
FIG. 5A is a time domain plot of the choke current for a setting "X" of potentiometer 23, corresponding to the plot of FIG. 2B.

Turning to the graph of FIG. 5A and referring to the description of the circuit of FIG. 1, if the potentiometer 23 has a setting of "X", the control circuit of FIG. 1 will cause the time domain wave form of the choke current illustrated in FIG. 5A to have a peak value $I_x$. During the time interval from $T_O$ to $T_A$, the choke current decreases as the flyback voltage in the choke 17 decreases. The time interval between $T_O$ and $T_A$ is a fixed interval determined by the duration of the astabile state of the multivibrator 18. At time $T_A$, the transistor 14 is turned on, and the choke current increases until, at time $T_B$, it reaches its peak value $I_x$. At this time, the setting "X" of potentiometer 23 causes the circuit to flyback. If the supply voltage from the source 16 is of sufficient magnitude, the choke current will increase very rapidly, so that the time period from $T_A$ to $T_B$, required for the choke current to increase to its peak value, after the transistor 14 is turned back on, may be quite short with respect to the period from $T_O$ to $T_A$ of the astabile state of the multivibrator 18. Therefore, in the absence of symmetry regulation, it is seen that the charging portion of the choke current wave form between $T_A$ and $T_B$ is much shorter than the flyback portion of the choke current between time $T_O$ and $T_A$. This corresponds to an on-time of the transistor 14 which is much shorter than its off-time.

Figure 5C:
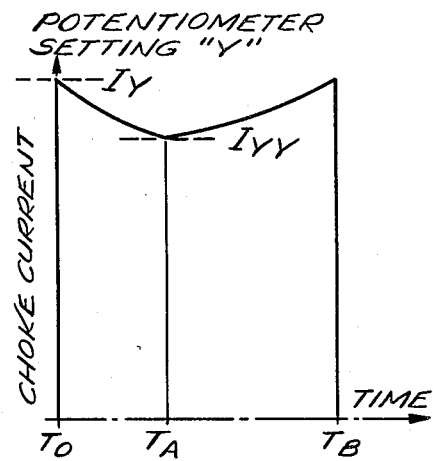
FIG. 5C is a time domain plot of the choke current for a setting "Y" of potentiometer 23 corresponding to the plot of FIG. 2B.
Figure 5B:
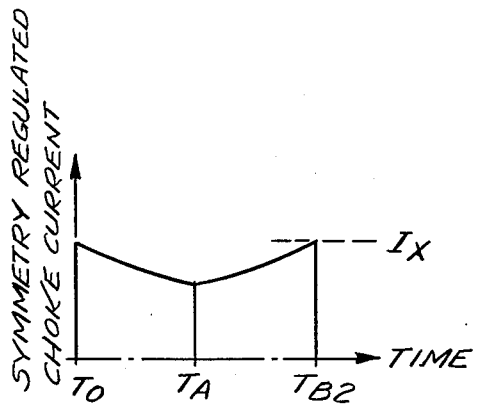
FIG. 5B is a time domain plot of the choke current corresponding to the setting "X" of potentiometer 23, but which is symmetry regulated.
Figure 5D:
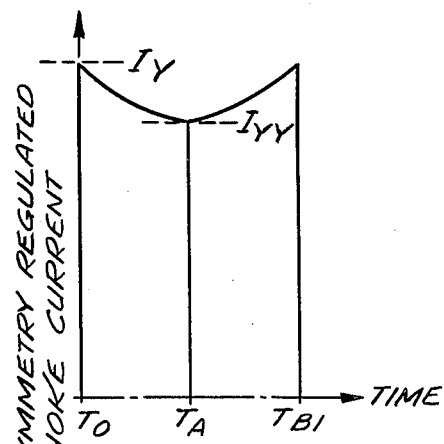
FIG. 5D is a time domain plot of the choke current corresponding to the setting "Y" of potentiometer 23, but which is symmetry regulated.
Figure 5E:
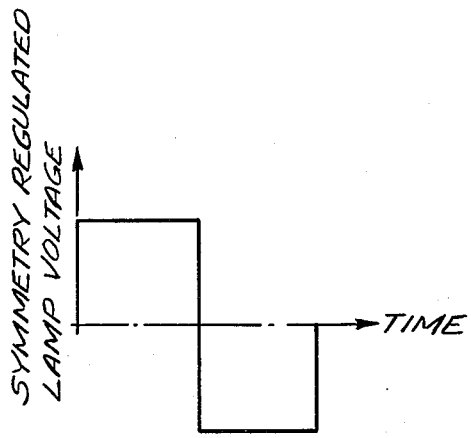
FIG. 5E is a time domain plot of the symmetry regulated lamp voltage wave form corresponding to the symmetry regulated choke current wave form of FIG. 5B.

If the symmetry regulated feedback control loop of FIG. 4 is introduced into the lamp control circuit, as illustrated in FIG. 4, the voltage $V_1$ supplied to the control circuit will be decreased by the symmetry control loop. As a result, after the transistor 14 is turned back on at time $T_A$, a much greater length of time is required for the current in the choke 17 to inrease to its maximum peak value $I_x$ determined by the setting X of potentiometer 23. The on-time of the transistor is increased as a result of the decrease in supply voltage, as illustrated in FIG. 5B. Note that the slope of the top of the positive portion of the choke current wave form in FIG. 5B is much more gradual than the corresponding portion in FIG. 5A. This is a direct result of the decrease of the supply voltage $V_1$ impressed across the choke 17. The symmetry regulation feedback control loop of FIG. 4 decreases the supply voltage $V_1$ from the voltage regulator 100 of FIG. 4 to increase time $T_B$ to time $T_{B1}$ precisely so that $(T_{B1}-T_A)=(T_A-T_O)$. As a result, the corresponding symmetry regulated voltage wave form of FIG. 5E is exactly symmetrical.

If the setting of the potentiometer 23 of FIG. 1 is changed from setting "X" to a higher setting "Y", the peak current through the choke 17 will increase from $I_X$ to $I_Y$. The choke current will decrease during the time interval from $T_O$ to $T_A$ to a value $I_{YY}$, as illustrated in FIG. 5C. When the transistor 14 is turned back on at time $T_A$, the choke current will increase from $I_{YY}$ back to its maximum peak value $I_Y$ determined by the setting "Y" of the potentiometer 23. If the voltage furnished by the source 16 in the absence of symmetry regulation is not very large, a long period of time corresponding to the interval $T_A$ to $T_B$ in FIG. 5C will be required for the current in the choke 17 to increase from $I_{YY}$ to $I_Y$. Therefore, the increasing potion of the choke current wave form of FIG. 5C will last for a much longer period of time, $T_A$ to $T_B$, than the increasing portion of the choke current wave form of FIG. 5C as defined by the time interval $T_O$ to $T_A$.

Figure 5F:
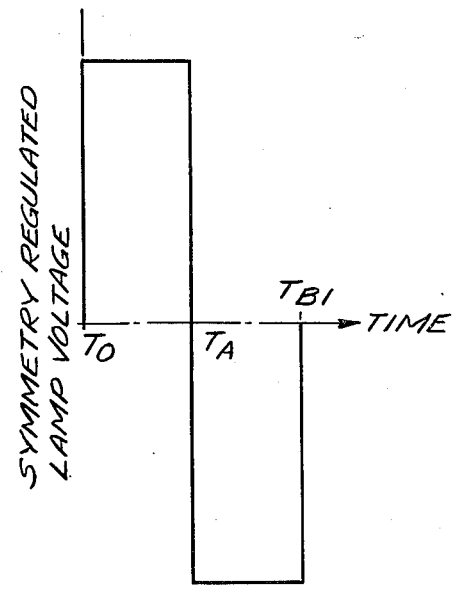
FIG. 5F is a time domain plot of the symmetry regulated lamp voltage wave form corresponding to the symmetry regulated choke current wave form of FIG. 5D.

If the symmetry regulation control loop of FIG. 4 is now introduced into the control circuit as illustrated in FIG. 4 while the potentiometer 23 has a setting of "Y", the symmetry control loop of FIG. 4 will cause the voltage supplied $V_1$ to the lamp circuit to increase. As a result, a shorter period of time will be required for the current through the inductor 17 to increase from $I_{YY}$ to $I_Y$. This current increase occurs, as shown in FIG. 5D, between time $T_A$ and time $T_{B1}$. Note that the slope of the top of the positive portion of the choke current wave form of FIG. 5D between time $T_A$ and $T_B$ is much steeper than the corresponding portion of FIG. 5C. This corresponds to the increase in the voltage $V_1$ impressed across the choke 17. With the increased setting "Y" of potentiometer 23, the introduction of the symmetry regulation control loop causes the time at which the lamp voltage reaches its peak value determined by the setting Y of potentiometer 23 to decrease from time $T_B$ in FIG. 5C to time $T_{B2}$ in FIG. 5D. The symmetry regulation control loop causes the voltage supplied $V_1$ to the lamp control circuit from the voltage regulator 100, to be increased precisely so that the interval defined by $T_A$ and $T_{B2}$ equals the interval defined by $T_O$ and $T_A$. As a result, the on-time of the transistor 14 equals its off-time and the lamp voltage wave form becomes symmetrical, as illustrated in FIG. 5F.

FIG. 6 shows a circuit similar to the circuit illustrated in FIG. 4 but including, in addition, a reference voltage feedback control loop and a protective circuit to protect the transistor 14 in the event that the lamp is removed from the circuit. The reference voltage control loop minimizes variations in lamp intensity due to changes in supply voltage, and includes a quasi-divider circuit 200 having one of its inputs 205 connected to the output 101 of the voltage regulator 100 and its other input 210 connected to a variable reference voltage source 215. The output 220 is connected to a voltage limiter 225, which, in turn, is connected to one input of the comparator 20. Voltage $V_L$ at the output 220 of the quasi-divider circuit 200 is proportional to the difference between reference voltage $V_R$ of the reference source 215 and output voltage $V_1$ of the voltage regulator 101 connected to the inputs 210 and 205, respectively, of the divider 220.

Figure 7:
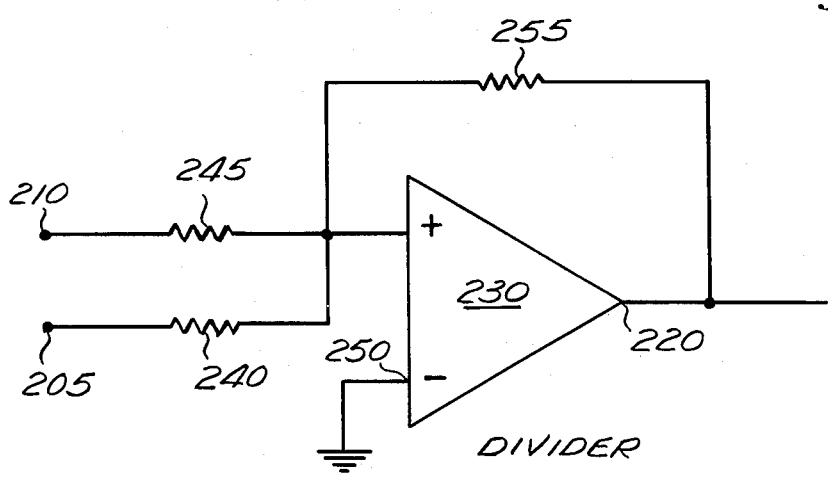
FIG. 7 is a schematic diagram of the quasi-divider circuit used in the circuit illustrated in FIG. 6.

The quasi-divider 200 is shown in detail in FIG. 7 as including a differential amplifier havings its negative input 235 connected through a resistor 240 to the input 205 and also connected through resistor 245 to the input 210. The positive input 250 of the differential amplifier 230 is connected to ground 125. Feedback resistor 255 provides scaling of the input voltages $V_R$ and $V_1$ and the output voltage $V_L$.

The operation of the reference voltage feedback control loop (FIG. 6) is as follows: The variable reference voltage source 215 may be varied to select voltage $V_2$ at the reference input of the comparator 20 so that the lamp 11 produces the illumination intensity desired by the user, as described above in connection with FIGS. 1, 2 and 3. If the output voltage $V_1$ of the voltage regulator 100 is reduced, the output voltage $V_L$ of the divider 200 will be increased. This is because the voltage difference between the inputs 210 and 205 will have been increased due to the radiation in $V_1$. The resulting increase in $V_L$ will cause a corresponding increase in the voltage $V_2$ at the reference input to the comparator 20. As described above in connection with FIGS. 1, 2, and 3, the increase in $V_2$ will cause a corresponding increase in the current flowing to the lamp 11. The resistors 240, 245, and 255 (FIG. 7) are selected so that the change in $V_2$ precisely makes up for the change in $V_1$ to maintain the power supplied to the lamp 11 at a nearly constant value. The output voltage $V_1$ of the regulator 100 may also increase after the reference voltage $V_R$ has been selected by the user. In this case, the difference between the voltages at the inputs 205 and 210 sensed by the divider circuit 200 will be smaller, which will result in a decrease in $V_L$ and a corresponding decrease in $V_2$ at the input of the comparator 20. This will result in a decrease in current supplied to the lamp 11 in the manner described above in connection with FIGS. 1, 2 and 3.

The voltage limiter 225 prevents excessive current from flowing through the lamp 11. It has already been pointed out that, if a high intensity mercury vapor lamp is used as the lamp 11, voltage initially applied to the lamp will cause it to ionize rapidly, causing an excessively large current to flow through the lamp while the lamp is still cold, which may damage the lamp 11. In order to prevent such an occurrence, the voltage limiter 225 clips the voltage $V_L$ supplied from the output 220 of the divider 200 to the reference input of the comparator 20. It has already been seen that the current through the lamp 11 is controlled by the voltage $V_2$ supplied to the reference input of the comparator 20. Thus, the limiter 225 prevents excessive currents from flowing to the lamp 11 by limiting the value of the $V_2$. The voltage limiter 225 may, for example, be a zener diode 225A connected between the output 220 of the divider 200 and ground. The voltage limiter 225 would thus clip the voltage $V_L$ at the output 220 to a maximum value equal to the breakdown voltage of the diode 225A.

When the gas discharge lamp 11 is in the warmed-up state and is momentarily extenguished due to power interruption, the voltage necessary to restart it is very large. Therefore, flyback voltage from the inductor 17 will cause the collector voltage on the transistor 14 to rise until the breakdown voltage rating of the transistor 14 is exceeded, causing damage to the transistor. In order to prevent damage to the transistor 14 in this manner, a protective circuit is provided which includes a metal oxide varistor 27 connected between the collector of the transistor 14 and input 265 of a comparator amplifier 270. Another input 275 of the comparator amplifier 270 is connected to a reference voltage source 280, and output 285 of the comparator amplifier 270 is connected to input 290 of a more stabile multivibrator 295. The output 300 of the multivibrator 295 is connected to shut-down terminal 305 of the voltage regulator 100. If the flyback voltage of the inductor 17 exceeds the breakdown voltage of the varistor 27, the varistor 27 causes a current to flow through resistor 261, and thus a voltage to appear at the positive input 285 of the comparator 270. The voltage of the reference source 280 is selected to be less than the voltage at the input 265 which occurs at breakdown of the varistor 27. Therefore, the comparator amplifier 270 senses a positive difference between its positive input 265 and its negative input 275 and therefore causes a positive signal to appear at its output 285 and at the input 290 of the one-shot multivibrator 295. This causes the multivibrator 295 to change state to produce a negative signal to appear at its output 300 for a predetermined length of time. This negative signal is conducted to the shut-down input 305 of the voltage regulator, which causes the voltage regulator 100 to turn off so that its output voltage $V_1$ goes to zero. At the end of the fixed time period of the multivibrator 295, the multivibrator 295 changes to its stable output state, and consequently the voltage regulator 100 again supplies power to the lamp 11. This cycle will repeat itself if, for example, the lamp 11 is disconnected or fails to ignite. The breakdown voltage of the varistor 27 is preferably selected to be less than the breakdown of the transistor 14, thus preventing damage to the transistor 14.

This protective circuit is necessary because the voltage required to ignite the lamp 11 is much greater when the lamp is warm than when it is cold. Therefore, if the lamp is turned off, it is usually necessary to permit it to cool before reigniting. Thus, during the fixed time period set by the duration of the astable state of the multivibrator 295, during which the voltage regulator 100 is shut down, the lamp 11 is permitted to cool down. Thus, when the regulator 100 is again permitted to turn on, the lamp 11 will ignite and begin to conduct before the flyback voltage of the inductor 17 reaches the breakdown voltage of either the varistor 27 or the transistor 14. On the other hand, if the lamp 11 is either too hot or is not connected, the shut-down cycle of the protective circuit will repeat itself.

Figure 8:
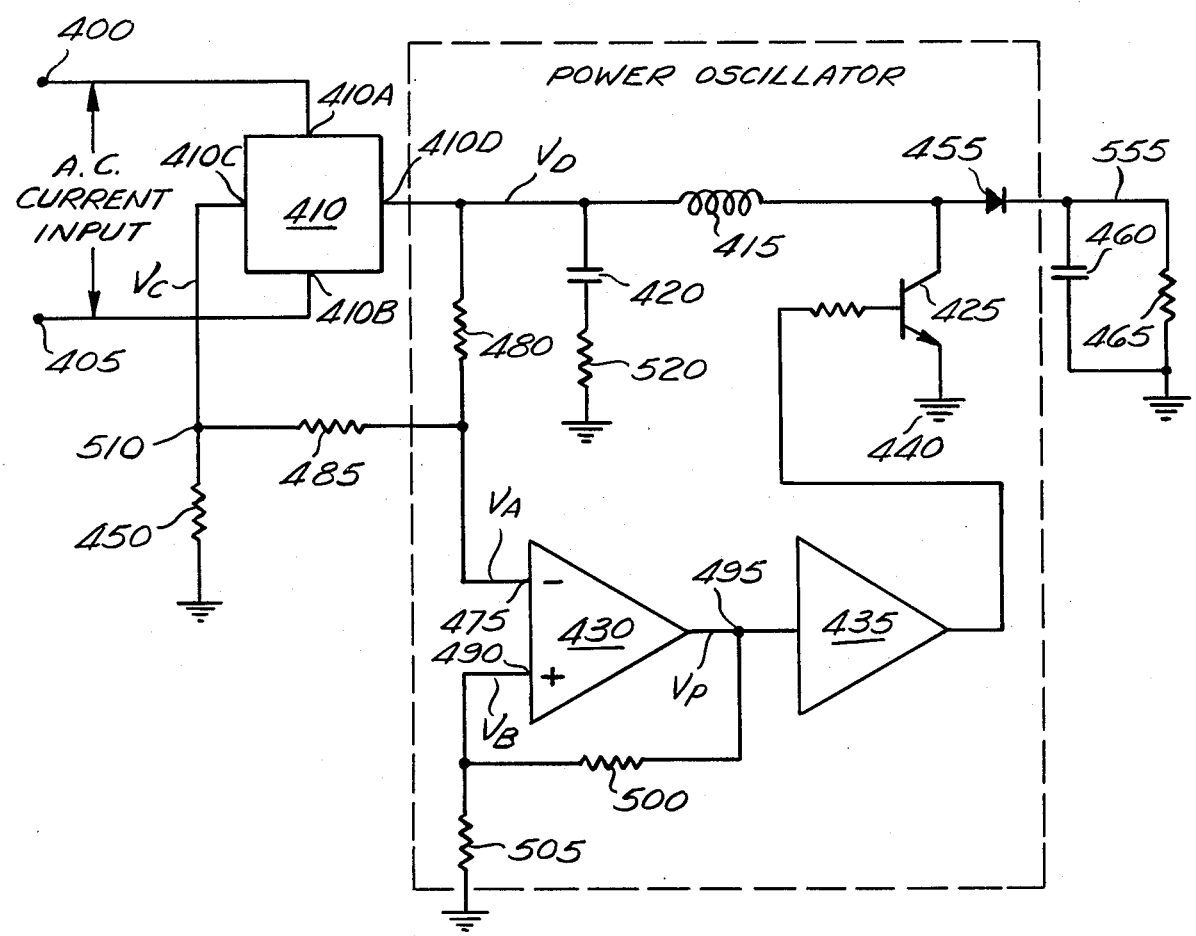
FIG. 8 is a schematic diagram of the current convertor and power oscillator of this invention.

The voltage regulator 100 of FIG. 6 includes an AC current converter shown in block diagram form in FIG. 8. Power is supplied to the current converter from a 60 Hertz current source to the inputs 400, 405 of the converter. A diode bridge 410 rectifies the 60 Hertz alternating current from a constant current source connected to inputs 410A, 410B to produce a rectified 60 Hertz current at outputs 410C, 410D. As will be seen in the explanation that follows, the current converter, illustrated in FIG. 8 regulates the power into a load 465 while presenting a purely resistive input impedance to 60 Hertz alternating current across the input terminals 400, 405.

The current converter of FIG. 8 includes a power oscillator comprising a choke 415, a capacitor 420, a transistor 425, a comparator amplifier 430, and a power amplifier 435. The inductance of the choke 415 and the capacitance of the capacitor 420 are preferably selected so that the power oscillator oscillates to switch the transistor 425 at a frequency of approximately 20 kiloHertz.

A sinusoidal 60 Hertz rectified current is produced at the output terminals 410C, 410D of the diode bridge 410. Current flows from output terminal 410D, charges capacitor 420, and flows through inductor 415. If the transistor 425 is on, the current flows from the inductor 415 to ground 440 where it returns through ground 445 and resistor 450 to the terminal 410C. If, on the other hand, the transistor 425 is off, the current flows through diode 455 and is divided between capacitor 460 and the load 465. The current returns from ground 470 to ground 445, through resistor 450, and back to the diode bridge terminal 410C. It may be seen that the proportion of the current flowing from the diode bridge terminal 410D through the load 465 is determined by the duty cycle of the transistor 425. Thus, the current converter controls the amount of current supplied to the load 465 by controlling the duty cycle of the transistor 425.

The base voltage of the transistor 425 is controlled by a comparator amplifier 430 through an inverting amplifier 435 connected to the base of the transistor 425. The negative input 475 of the comparator amplifier 430 is connected to the output terminal 410D through voltage divider resistors 480, 485. The positive input 490 to the comparator amplifier 430 receives positive feedback from the output 495 of the comparator amplifier through voltage divider resistors 500, 505. The comparator amplifier 430 has a saturated output voltage which shall be denoted $V_p$. If the voltage $V_A$ on the negative input 475 exceeds the voltage $V_B$ on the positive input 408, the comparator amplifier 430 will saturate to its maximum negative output, $-V_p$ by virtue of the positive feedback to the input 490. Thus, the voltage at the output 495 will be equal to $-V_p$. On the other hand, if the voltage $V_A$ at the negative input 475 is less than the voltage $V_B$ at the positive feedback input 490, the comparator amplifier 430 will saturate to maximum positive output so that the voltage at its output 495 will be $+V_p$. The output voltage $\pm V_p$ of the comparator amplifier 430 is inverted and amplified by the amplifier 435 and applied to the base of the transistor 425. The positive feedback voltage applied to the positive input 490 is divided by the resistors 500, 505 to: $V_p (R_{505}/(R_{500}+R_{505}))$. The comparator 430 will switch between its most positive and most negative output voltages $+V_p$ and $-V_p$, whenever the voltage $V_A$ at the negative input 475 is equal to $V_p (R_{505}/(R_{500}+R_{505}))$. If the power oscillator is to oscillate by switching the transistor 425 at a frequency of 20 kilohertz, the output of the comparator amplifier 430 at its output terminal 495 must switch back and forth between $+V_p$ and $-V_p$ at the same frequency. This, in turn, requires that the voltage at the negative input terminal 475 must oscillate at a frequency of 20 kilohertz between $+V_p (R_{505})/(R_{500}+R_{505}))$ and $-V_p ((R_{505})/(R_{500}+R_{505}))$. Therefore, it is seen that the voltage at the negative input terminal 475 averaged over one oscillation period must be zero. From this, it follows that the input impedance presented to the 60 Hertz current source across the input terminals 400, 405 is purely resistive, which shall be shown as follows.

The current flowing through the diode bridge 415 between its terminals 410D and 410C shall be defined as $I_N$. The value of the resistors 480, 485 is preferably much larger than the value of the resistor 450 or the resistance of the load 465. Furthermore the capacitor 420 is preferably selected so that it offers a very high impedance to the 60-Hertz rectified current flowing from the terminal 410D. Therefore, it is seen that voltage $V_C$, at the terminal 410C may be defined as follows:

$$V_c = -R_{450}I_N.$$

It has already been seen that the voltage supplied to the negative input terminal 475 averaged over a 20 kilohertz oscillation cycle must be zero, and therefore voltage, $V_{515}$, at node 515 must be zero when averaged over an oscillation period. If the voltage at the output terminal 410D is defined as $V_D$, it may be easily shown from the foregoing that:

$$V_D = R_{450}I_N((R_{480}/R_{485}) = 1).$$

Defining the input voltage between the input terminals 400, 405 to be $V_N$, it is seen that:

$$V_N = V_D - V_C.$$

From this it follows that:
$$V_N = I_N R_{450}((R_{480}/R_{485}) + 1).$$

Recognizing the ratio of $V_N$ to $I_N$ as the resistance between the terminals 400, 405, it is seen that the current converter of FIG. 8 offers a purely resistive input impedance to the 60-Hertz current source connected to the input terminals 400, 405, and that this resistance is determined by the resistance of the resistors 450, 480, and 485. This feature is particularly advantageous in the voltage regulator 100 because it substantially eliminates the occurrence of reactive power losses typically present whenever reactive components, such as inductors or capacitors, change the phase of the current with respect to the voltage, resulting in inefficient use of the electrical power.

From the foregoing, it may be easily shown that the power consumed by the voltage regulator 100 incorporating the current converter of FIG. 8 is:

$$E_N I_N = I_N^2 R_{450}((R_{480}/R_{485}) + 1).$$

From this it is seen that the power consumed by the current converter is independent of the resistance of the load 465, and thus the current converter of FIG. 8 regulates the power consumed and prevents changes due to load resistance variations.

FIG. 9 illustrates various current and voltage wave forms in various points in the current converter near the diode bridge 410. The input current $I_N$ supplied to the input terminals 400, 405 is illustrated in FIG. 9A as a 60 Hertz sinusoid. In FIG. 9B, the voltage at the terminal 410C, $V_C$, which has been seen to equal $-I_N \times R_{450}$, is plotted as a rectified 60-Hertz sinusoid of negative polarity. As discussed above, $V_D$ is equal to $I_N R_{450}(R_{480}/R_{485})+1)$, and the $V_D$ is plotted in FIG. 9C as a 60-Hertz full wave rectified sinusoid of positive polarity. The current flowing from the terminal 410D to the terminal 410C is a function if $I_N$ and is plotted in FIG. 9D as a 60-Hertz rectified sinusoid of positive polarity. FIG. 9E is a plot of $V_N$, as it appears across the inputs 400, 405. It is significant that the wave form of the plot of FIG. 9E is in phase with the wave form of the plot of FIG. 9A, because the input voltage and the input current are in phase with one another. This in-phase relationship is a result of the fact that input impedance presented by the current converter of FIG. 8 to the 60-Hertz input current at the input terminals 400, 405 is purely resistive. This assures maximum efficient use of power by the current converter and prevents reactive power losses.

A description of the operation of the power oscillator of the current converter of FIG. 8 may begin with a current $I_D$ flowing from the terminal 410D and a voltage $V_A$ at the negative input 475 to comparator 430 which is greater than the positive feedback voltage $V_B$ at the positive input terminal 490. The comparator 430 will sense a negative difference at its inputs and produce a negative output voltage $-V_p$ at its output 495. The amplifier 435 will invert the $V_p$ output voltage to a positive voltage and this positive voltage will be applied to the base of the transistor 425. The transistor 425 responds to the positive voltage at its base by turning on and conducting current to ground 440. Thus, the current $I_N$ will flow through the transistor 425 to ground 440. This current returns through ground 445 through resistor 450 to the return terminal 410C. The capacitance of the capacitor 420 is preferably selected to operate a high impedance to the 60-Hertz current but provides some smoothing to the 60-Hertz ripple in $I_N$. Thus, the 60-Hertz $I_N$ essentially does not flow through the capacitor 420. Because the transistor 425 has been turned on, the current $I_N$ is permitted to bypass the resistance of the load 465, and is offered a lower resistance path directly through the resistor 450 and back to the return terminal 410C. As a result, the current through the inductor 415 increases, causing the capacitor 420 to discharge through the inductor 415 to contribute to the increased current drawn through the inductor 415. As a result, the potential across the resistor 520 decreases and becomes negative as the capacitor 420 discharges. Likewise, the voltage at the negative input 475 to the comparator 430 decreases and becomes negative. The negative voltage at the input 475 will continue to increase in magnitude until it equals the negative voltage supplied through the feedback resistor 500 to the positive terminal 490, $-V_p(R_{505}/(R_{500}+R_{505}))$. As soon as the comparator 430 senses that the voltage at its two inputs 475, 490 are equal, it switches to its most positive input voltage, $+V_p$. The positive output voltage $V_p$ is inverted and amplified by the amplifier 435 and applied to the base of the transistor 425. The resulting negative voltage causes the transistor 425 to turn off, thereby forcing the current through the inductor 415 to be divided between the capacitor 460 and the load 465.

At this point, the current flowing from the terminal 410D through the inductor 415 is now presented with a higher resistance, and it therefore begins to decrease over a period of time at a rate controlled by the inductance of the inductor 415. As a result of this decrease in current, the capacitor 420 no longer discharges but instead begins to be charged by current flowing from the terminal 410D. As a result, the voltage across the capacitor 420 beings to increase. This causes an increase in voltage across the resistor 520 and an increase in voltage $V_D$ at the terminal 410D. The voltage $V_A$ at the negative input 475 of the comparator 430 begins to increase, and continues to increase until it equals the voltage $V_B$ at the positive feedback terminal 490. As soon as the voltage at the negative input 475 has increased to equal the voltage at the positive feedback input 490, the comparator 430 changes state so that its output saturates to $-V_p$, and the entire cycle repeats itself. The comparator 430 switches its output between $+V_p$ and $-V_p$ at a frequency of approximately 20 kilohertz, which is a frequency controlled by the inductance of the inductor 415 and the capacitance of the capacitor 420. The frequency of oscillation, while preferably near 20 KHz, is also proportional to the 60 Hertz input current $I_N$ flowing from the terminal 410D. Thus, the power oscillator will oscillate in the above-described manner at a frequency slightly less than 20 KHz when the 60 hertz current $I_N$ nears its minimum value and will oscillate at a frequency somewhat greater than 20 KHz when $I_N$ reaches its peak value. Thus, the oscillation frequency of the power oscillator is slightly modulated by the 60 hertz line frequency cycle.

Figure 9A:
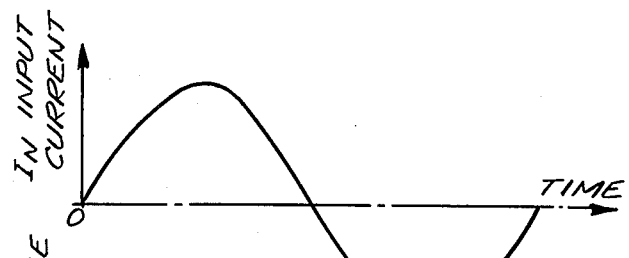
FIG. 9A is a time domain plot of the wave form of the input current $I_N$ at the input to the current convertor of FIG. 8.
Figure 9B:
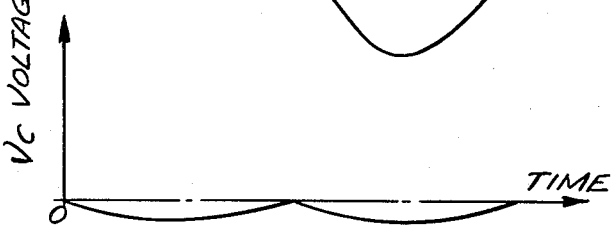
FIG. 9B is a time domain plot of the voltage $V_C$ at the return terminal of the diode bridge of the current convertor of FIG. 8.
Figure 9C:
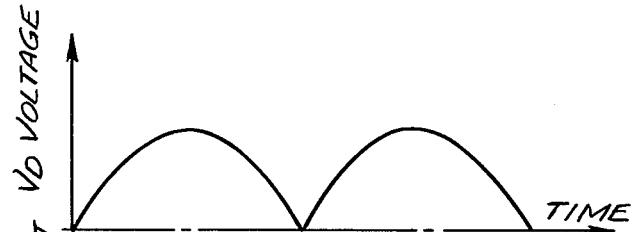
FIG. 9C is a time domain plot of the rectified voltage $V_D$ at the output of the diode bridge of FIG. 8.
Figure 9D:
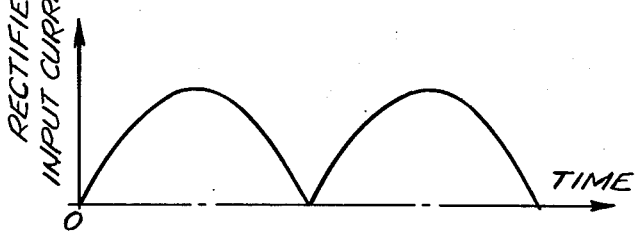
FIG. 9D is a plot of the total current output of the diode bridge of FIG. 8.
Figure 9E:
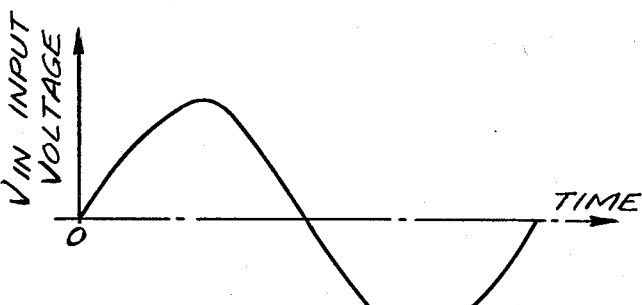
FIG. 9E is a time domain plot of the input voltage across the diode bridge of FIG. 8.
Figure 10A:
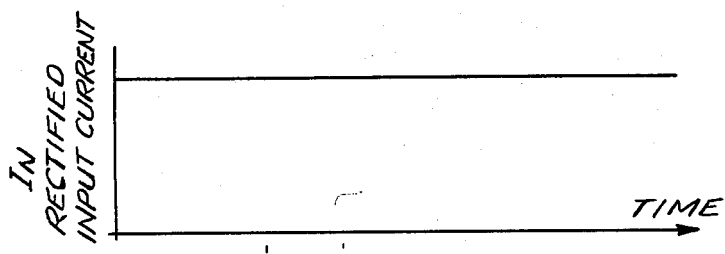
FIG. 10A is a time domain plot of the input current $I_N$ similar to the plot of FIG. 9A, but having its time scale considerably expanded.
Figure 10B:
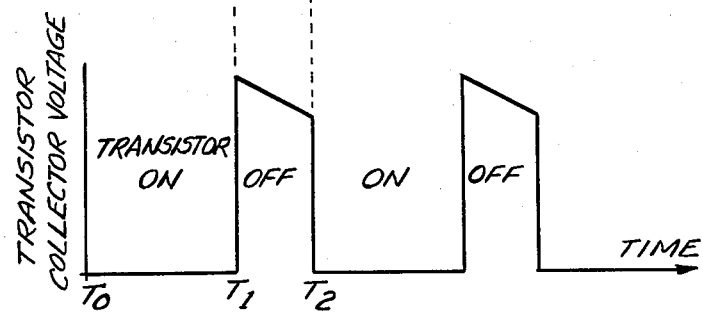
FIG. 10B is a time domain plot of the collector voltage across the oscillator transistor of FIG. 8, FIG. 10C includes superimposed plots of $V_{520}$, the 20 kHz voltage in the power oscillator of FIG. 8, $V_{420}$, the 60-Hertz output voltage at the output of the diode bridge of FIG. 8, and $V_D$, the total voltage at the output of the diode bridge of FIG. 8 including the 20-kHz ripple voltage superimposed upon the 60-Hertz output voltage.
Figure 10C:
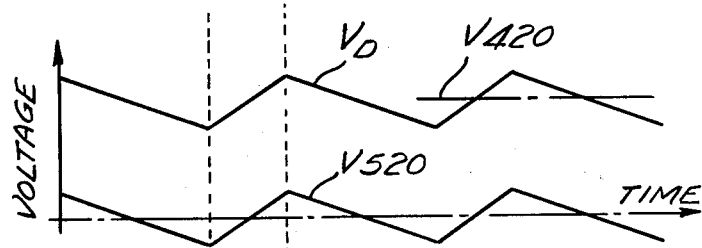

FIG. 10A is the same plot as FIG. 9A except that the time scale is greatly expanded so that the 60 hertz sinusoid appears to be a stright line. FIG. 10B illustrates the voltage across the transistor 425. The wave form of the transistor voltage is a nearly square wave having a frequency of 20 kilohertz corresponding to the frequency of the power oscillator. FIG. 10C illustrates three plots. The plot labeled $V_{520}$, FIG. 10C, is a plot of the voltage across the resistor 520 as a function of time. This clearly shows that when the transistor is turned on at time $T_O$, the current discharging through the capacitor 420 causes the voltage $V_{520}$ across the resistor 520 to decrease and become more negative until the comparator 430 switches at time $T_1$. At time $T_1$, the transistor is turned off, and the capacitor 420 begins to charge, causing the voltage $V_{520}$ across the resistor 520 to increase until it becomes positive. As is apparent in FIG. 10C, the voltage $V_{520}$ increases until the comparator 430 switches back to its negative output state. As previously discussed, the capacitance of the capacitor 420 is preferably selected so that variations in voltage across the capacitor are minimal and the capacitor offers insignificant impedance to the 20 kilo Hertz oscillating current. Accordingly, in FIG. 10C, the plot of the voltage across the capacitor, labeled $V_{420}$, appears as a straight line. Another plot in FIG. 10C is labeled $V_D$, the voltage at the output 410D. $V_D$ is the sum of the voltage across the capacitor, $V_{420}$, plus the voltage across the resistor $V_{520}$ and is superimposed on the two plots, $V_{520}$ and $V_{420}$ in FIG. 10C.

Figure 10D:
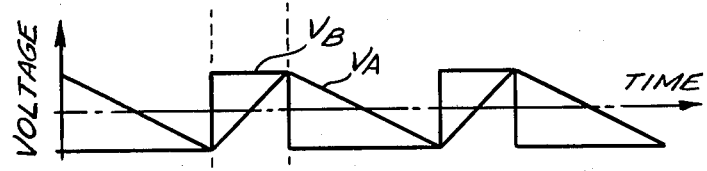
FIG. 10D is a time domain plot of the voltage $V_A$ at the negative input to the comparator amplifier of FIG. 8, and $V_B$, the positive feedback to the comparator amplifier of FIG. 8.

The plot of FIG. 10D illustrates the voltage $V_A$ at the negative input to the comparator 430 and the voltage $V_B$ at the positive terminal 490 of the comparator 430. $V_B$ alternates between $-V_p(R_{505}/(R_{500}+R_{505}))$ and $+V_p (R_{505}/(R_{500}+R_{505}))$. $V_A$ must oscillate between these same two limits. FIG. 10D clearly shows that the comparator 430 changes state only when $V_A = V_B$, which occurs alternately at the upper and lower peak voltages of $V_B$. Thus, it is apparent that $V_A$ is constrained to the upper and lower limits of $V_B$. It may be easily shown that the positive and negative peak values of the voltage $V_{520}$ are plotted in FIG. 10C are constrained to $+V_p((R_{505}/(R_{500}+R_{505}))((R_{480}+R_{485})/R_{485})$.

Figure 10E:
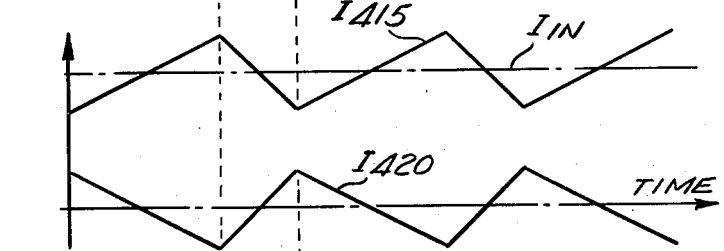
FIG. 10E is a time domain plot of $I_{420}$, the current through the snubbing capacitor at the diode bridge output of FIG. 8, and of I$_{415}$, the current through the inductor of FIG. 8.

Thus, the magnitude of the oscillation of the power oscillator is controlled by the maximum voltage output $V_p$ of the comparator 430. The resulting current wave forms are illustrated in FIG. 10E. The plot labeled in FIG. 10E as $I_{420}$ is defined as the current through the capacitor 420. As already discussed, the capacitor 420 presents a very high impedance to the 60 hertz input current $I_N$ but presents a very low impedance to the 20 kilohertz oscillating current. Therefore, the current $I_{420}$ through the capacitor 420 oscillates at a frequency of 20 kilohertz about zero. The current $I_{415}$ through the choke 415 is equal to the difference between the input current $I_N$ flowing through the output terminal 410D and the current $I_{420}$ flowing through the capacitor 420. Therefore, the plot labeled $I_{415}$ in FIG. 10E may be derived by subtracting the plot of $I_{420}$ in FIG. 10E from the plot of the current $I_N$ in FIG. 10A. FIG. 10E shows that while the current $I_{415}$ to the inductor 415 is always positive, the 20 KHz oscillation in $I_{415}$ causes the current $I_{420}$ through the capacitor 420 to oscillate about zero current.

Figure 10F:
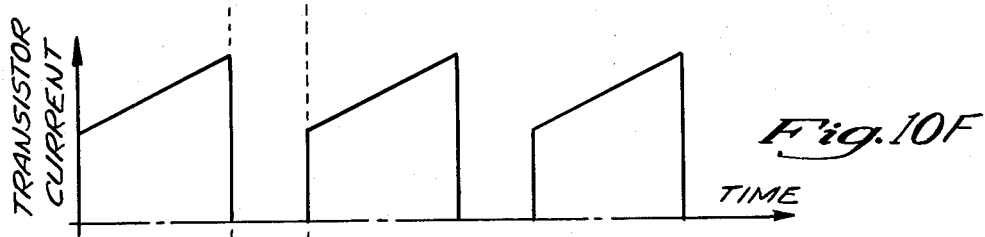
FIG. 10F is a time domain plot of the current through the power oscillator transistor of FIG. 8.
Figure 10G:
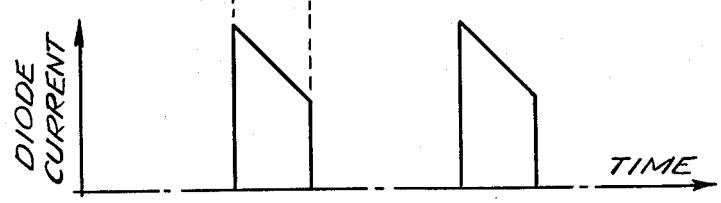
FIG. 10G is a time domain plot of the current through the output diode of the power oscillator of FIG. 8.

FIG. 10F is a plot of the current through the transistor 425, and it is seen that during the time that the transistor 425 is turned on, between time $T_0$ and $T_1$, the current through the transistor 425 follows the current $I_{415}$ through the inductor 415 plotted in FIG. 10E. The current through the diode 455 is plotted in FIG. 10G and it is seen that the current through the diode 455 follows the current $I_{415}$ through the inductor 415 while the transistor 425 is turned off. The current through the diode 455 is divided between the load 465 and the capacitor 460. Because the relationship $E_{1n}I_{1N} = I_N^2 R_{450}((R_{480}/R_{485})+1)$ was established supra, defining the input power, and because it can be shown that the losses in inductor 415, transistor 425, and diode 455 are small and relatively constant, it follows that the output power is constant, and the output current $I_1$ and voltage $V_1$ may be controlled by controlling the resistance of $R_{485}$. In fact, the resistance of $R_{485}$ may be varied in a feedback control loop designed to control the output current or voltage of the current converter of FIG. 8. Such a concept is illustrated in FIG. 11.

In FIG. 11, the resistor 485 is replaced instead by a field effect transistor 540. In the exemplary embodiment of FIG. 10, the transistor 540 is an N-channel field effect transistor. The feedback control loop consists of a differential amplifier 545 having its negative input 550 connected to output 555 of the current converter of FIG. 8. Positive input 560 of the amplifier 545 is connected to a reference voltage $V_S$. The output 570 of the amplifier 545 is connected to the gate of the field effect transistor 540. The current converter of FIG. 8 together with this feedback loop comprise the voltage regulator 100 of FIG. 4. The feedback loop, including the amplifier 545 acts as a supply voltage feedback control loop and controls the output voltage $V_1$ at the output of the voltage regulator of FIG. 11.

The operation of the feedback loop is as follows. If $V_1$ exceeds $V_S$, the amplifier 545 will sense a negative difference between its inputs 550, 560 and will produce a negative voltage at its output 570 proportional to the difference between $V_S$ and $V_1$. This negative voltage is applied to the gate of the field effect transistor 540, which causes the resistance of the transistor 540 to increase. This is equivalent to an increase in the resistance of $R_{485}$ in FIG. 8. The peak value of $I_{415}$, being inversely proportional to $R_{485}$, will be decreased. Likewise, if the output voltage $V_1$ is less than $V_S$, the amplifier 545 will sense a positive difference between its inputs and apply a positive voltage to the gate of of the field effect transistor 540, thereby causing a decrease in the resistance of the field effect transistor 540. This will cause a consequent increase in the power delivered to the load 465. It has already been seen that this power varies according to the ratio of $1/R_{485}$. Variations in the resistance of the field effect transistor 540 are equivalent to a variation in the resistance of $R_{485}$. Thus, it is seen that the output power and consequently the voltage $V_1$ supplied to the load 465 are readily controlled by controlling the resistance of the field effect transistor 540 in the supply voltage feedback control loop.

Figure 13A:
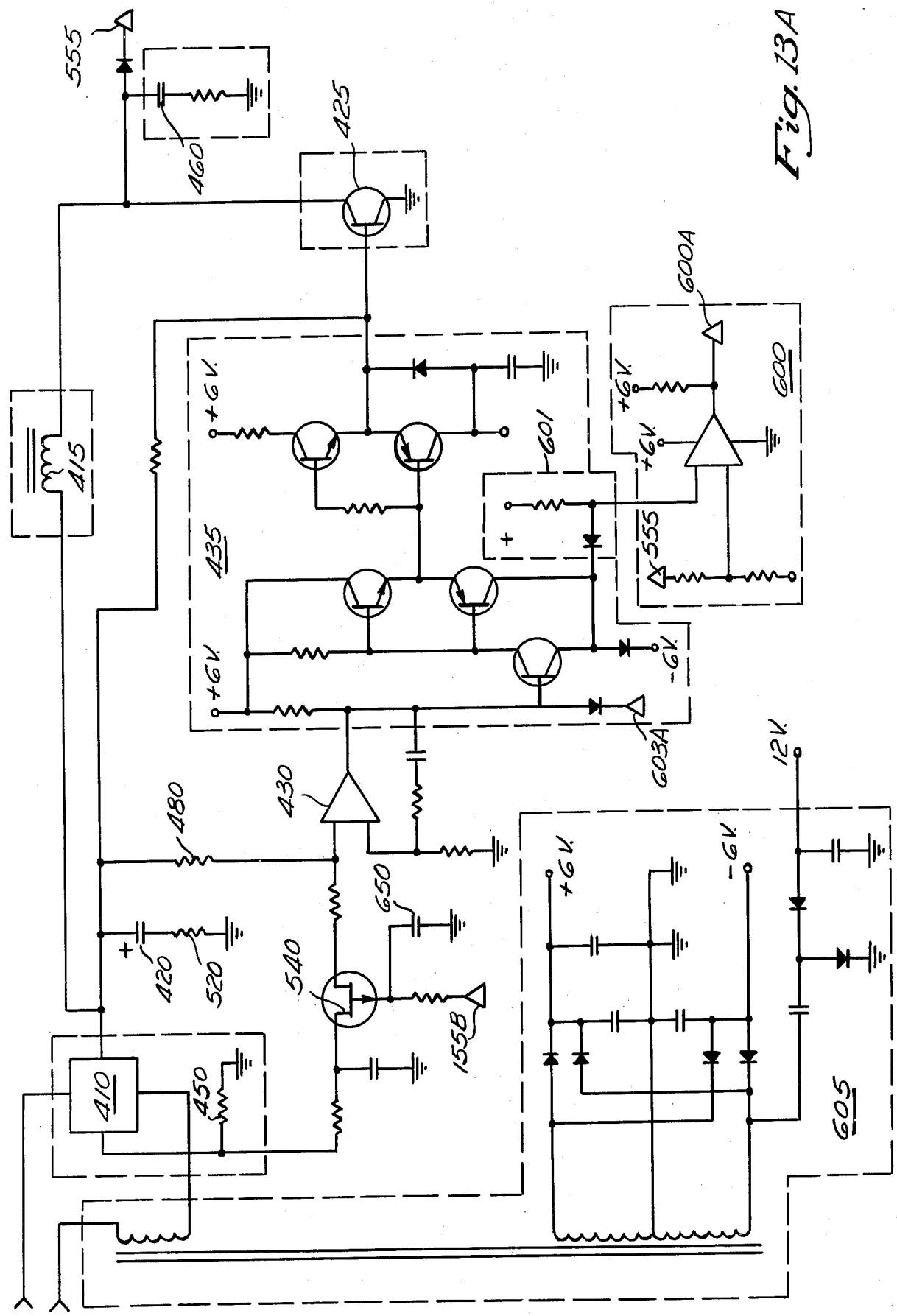
FIGS. 13A and 13B, jointly, is a detailed schematic layout diagram of the circuit of FIG. 12.
Figure 13B:
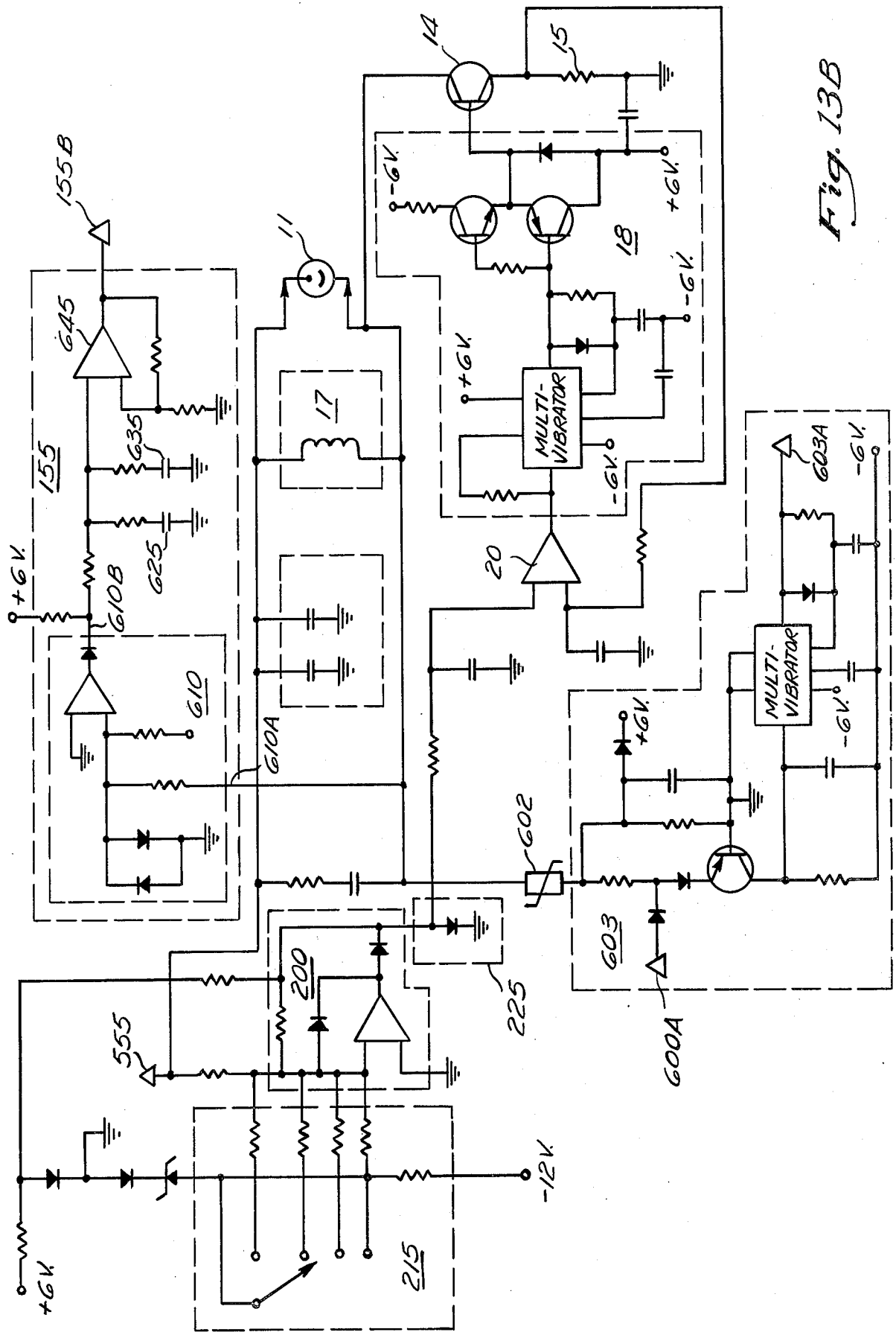

A high frequency symmetry regulated lamp control circuit illustrated in the composite schematic diagram of FIGS. 13A and 13B has been built to include the foregoing features, and FIG. 12 is a simplified block diagram of that circuit. Essentially, the circuit of FIG. 12 includes the circuit illustrated in the block diagram of FIG. 6 in which the voltage regulator of FIG. 11 is used as the voltage regulator 100 of FIG. 6. Thus, the circuit of FIG. 12 is a combination of the circuits illustrated in FIGS. 4 and 11, and includes, in addition, an over-voltage detector 600 which protects the electrolytic capacitor 460, and a 6-volt DC power supply 605 to operate the electronics in the various components of the circuit in the block diagram of FIG. 11.

In FIG. 12, the supply voltage feedback control loop includes a symmetry detector 155 having its input 155a connected to the collector of transistor 14 and its output 155b connected to the gate of the field effect transistor 540. As discussed above, in connection with FIGS. 8 and 11, the field effect transistor 540 replaces the resistor 485 of FIG. 8 to provide variable control over the value of the output voltage $V_1$. It will be remembered that the value of $V_1$ is controlled by the ratio $(R_{480}+R_{485})/R_{485}$. The value of $R_{485}$ is controlled by changing the resistance of the transistor 540.

The details of the symmetry detector 155 are best seen by reference to FIGS. 13A and 13B. These figures show that the symmetry detector 155 includes an amplifier circuit 610 having its input 610a connected to the collector of the transistor 14. Output 610b of the amplifier circuit 610 is connected through resistor 615 to resistor and capacitor pairs 620, 625, and 630, 635. Both capacitor resistor pairs 620, 625, and 630, 635, are connected between ground 640 and the positive input to amplifier 645. The output of amplifier 645 is connected across capacitor 650 to the gate of the field effect transistor 540.

The amplifier circuit 610 produces an output voltage of plus 6 volts at its output 610b whenever the transistor 14 is off, and produces an output voltage of minus 6 volts at its output 610b whenever the transistor 14 is on. The current flowing from the output 610b charges the capacitors 625, 635 to a positive or negative voltage depending upon the polarity of the voltage at the output 610b. It follows that the magnitude and polarity of the voltage on the capacitors 625, 635 is determined by the difference between the off time of the transistor 14 and its on time. Thus, if the on time of the transistor 14 is greater than its off time, the voltage across the capacitors 625, 635 will be negative, since a negative charge will be accumulated at the ungrounded plates of the capacitors 625, 635. On the other hand, if the off time of the transistor 14 exceeds its on time, a net positive charge will be accumulated at the ungrounded plates of the capacitor 625, 635, and a positive voltage will appear across these capacitors. The voltage appearing across the capacitors 626, 635 is amplified and scaled by the amplifier 645. The output of the amplifier 645 is applied across the capacitor 650 to the gate of the field effect transistor 540. If the off time of the transistor 14 exceeds its on time, it is seen that the output of the amplifier 645 will be positive, and will cause the voltage across the capacitor 650 to increase to a higher positive value. The transistor 540 in the embodiment of FIGS. 13A and 13B is preferably a P-channel field effect transistor. Therefore, the increasingly positive voltage across the capacitor 650, which is applied to the gate of the transistor 540 causes the resistance of the transistor 540 to increase. As discussed above, the output voltage $V_1$ of the voltage regulator 100 is controlled by the resistance of the transistor 540, and therefore $V_1$ will decrease. The on time of the transistor 14 will begin to increase, causing a corresponding decrease in the positive voltage across the capacitors 625, 635 and a corresponding decrease in the positive output voltage of the amplifier 645. Thus, the rate at which the capacitor 650 is charged slowly decreases until the on time of the transistor 14 is nearly equal to its off time. At this point, the net charge accumulated on the capacitors 625, 635 is almost zero. Thus, the amplifier 645 no longer increases the voltage across the capacitor 650 and therefore the voltage applied to the gate of the transistor 540 becomes constant. This stabilizes the transistor 540 and stabilizes the output voltage $V_1$ of the voltage regulator 100. At this point, $V_1$ equals $V_S$, the symmetry voltage of the lamp.

Conversely, if the on time of the transistor 14 is greater than its off time, a negative voltage will begin to appear across the capacitor 625, 635, causing the output from the amplifier 645 to become negative. Thus, the amplifier 645 begins to decrease the voltage across the capacitor 650 and continues to do so until the resistance of the transistor 545 has increased sufficiently to cause the output voltage $V_1$ of the voltage regulator 100 to decrease, causing a corresponding increase in the on time of the transistor 14. The feedback loop is stabilized as soon as the on time has increased to equal the off time of the transistor 14. At this point, the net voltage across the capacitor 625, 635 is null, and, as a result, the amplifier 645 no longer reduces the charge on the capacitor 650. Thus, the voltage at the gate of the transistor 540 and the corresponding resistance of the transistor 540 is stabilized corresponding to a stabilized value of the output voltage $V_1$ which is equal to the symmetry voltage $V_S$ of the lamp.

Figure 14:
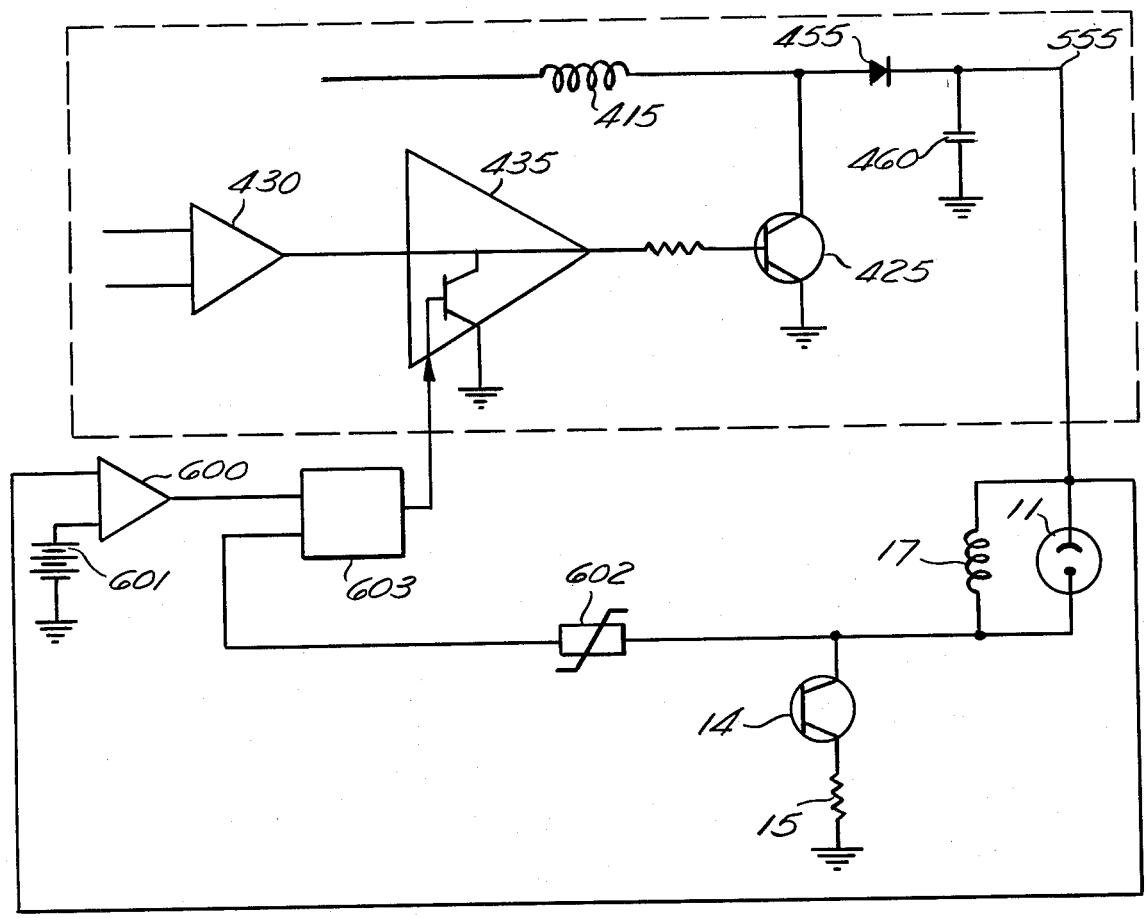
FIG. 14 is a block diagram of the shut-down protective circuit of FIGS. 12 and 13.

A shut-down circuit is illustrated in the detailed composite schematic in FIGS. 13A and 13B and includes a comparator circuit 600, a reference voltage source 601, a varistor 602, a multivibrator circuit 603 connected to amplifier circuit 435, and is somewhat different from the shut-down circuit discussed above in connection with FIG. 6. As discussed above in connection with FIGS. 8 and 11, the output of the comparator 430 is conditioned by the amplifier circuit 435 to control the transistor 425. As discussed above in connection with FIG. 6, the shut-down circuit operates to shut-down the output of the voltage regulator 100. The shut-down circuitry of FIGS. 13A and 13B is shown in simplified block diagram form in FIG. 14. The varistor 602 is connected between the collector of the transistor 14 and the input to the multivibrator circuit 603. The output of the multivibrator circuit 603 is connected to the amplifier 435. Another input to the multivibrator circuit 603 is controlled by the output of the comparator 600. One input of the comparator amplifier 600 is connected to the output 555 of the voltage regulator 100. The other input to the comparator amplifier 600 is connected to the reference voltage source 601. The shut-down circuit illustrated in FIG. 14 will null the output voltage $V_1$ at the output 555 of the voltage regulator 100 for a duration of predetermined length if either the output voltage $V_1$ of the voltage regulator 100 exceeds a magnitude defined by the reference voltage source 601 or if the collector voltage of the transistor 14 exceeds the breakdown voltage of the varistor 602. The operation of the shut-down circuit is as follows. The comparator amplifier 600 produces a voltage output which is proportional to the voltage difference between its two inputs. If the output voltage $V_1$ of the voltage regulator 100 exceeds the magnitude defined by the reference voltage source 601, the comparator amplifier 600 will output a positive voltage to the input of the multivibrator circuit 603. The multivibrator circuit 603 will respond by changing state to produce an output signal to the amplifier 435 which causes the amplifier 435 to hold the voltage at the base of the transistor 425 to a positive value in order to hold the transistor 425 on. At the end of a predetermined length of time, the multivibrator returns to its original state, so that the amplifier 435 no longer holds the transistor 425 in its on state. While the transistor 425 is held in its on state, all the current flowing through the inductor 415 is returned to ground through the transistor 425, thereby causing the output voltage $V_1$ of the voltage regulator 100 to drop to zero. Thus, the output voltage is nulled during the predetermined length of time defined by the astabile state of the multivibrator circuit 603. Similarly, if the collector voltage of the transistor 14 exceeds the breakdown voltage of the varistor 602, the varistor 602 will break down causing this voltage to appear at the input to the multivibrator circuit 603. Again, the multivibrator circuit 603 will switch to its astabile state and cause the output voltage $V_1$ to be zero for a predetermined length of time in the same manner. The comparator amplifier 600 prevents the output voltage $V_1$ from exceeding the capacity of the capacitor 460, thereby protecting the capacitor 460. This is an important feature because the capacitor 460 is preferably a large electrolytic capacitor which smooths the output voltage $V_1$ of the voltage regulator 100. The varistor 602 prevents the collector voltage on the transistor 14 from exceeding the breakdown voltage of the transistor. Preferably, the breakdown voltage to the varistor 602 is less than the breakdown voltage of the transistor 14. This feature is useful because, if the lamp 11 were to be monentarily disconnected then reconnected, the re-ignition voltage of the warm lamp 11 would exceed the breakdown voltage of the transistor 14. The shut-down circuit of FIG. 14 causes the voltage regulator 100 to turn off before the collector voltage can damage the transistor 14. It shuts the voltage regulator 100 off for the predetermined length of time defined by the multivibrator circuit 603 during which the lamp 11 has an opportunity to cool. When the lamp 11 has sufficiently cooled, its re-ignition voltage is less than the breakdown voltage of the transistor 14, and the voltage regulator 100 may then be turned back on. The shut-down circuit may cycle several times while the lamp 11 has a chance to cool sufficiently.

While FIGS. 13A and 13B illustrate the currently preferred embodiment of the invention, it should be recognized that the invention may be implemented in a number of different ways to provide a symmetry regulated voltage source. For example, in the embodiment of FIGS. 13A and 13B the field effect transistor 540 is a p-channel FET, whereas, if the output of the symmetry detector 155 is inverted, the transistor 540 may be an N-channel FET.

What is claimed is:

1. A circuit for driving a lamp comprising:
    switching circuit means connected to said lamp having first and second switching states;
    a power supply connected to drive said switching circuit means, the output of said power supply determining the difference between the time durations of said first and second states; and
    symmetry corrective means connected to sense said difference and also connected to vary the output of said power supply in proportion to said difference.

2. A circuit for driving a lamp as defined in claim 1 wherein said corrective means varies the output voltage of said power supply.

3. A circuit for driving a lamp as defined in claim 2 wherein said corrective means comprises a symmetry detector connected between said lamp switching circuit means and said power supply.

4. A circuit for driving a lamp as defined in claim 3 wherein said switching means has a negative output voltage in said first state and a positive output voltage in said second state, and said symmetry detector comprises integrating capacitor means for sensing a net negative voltage or a net positive voltage respectively, and said corrective means further comprises field effect transistor means responsive to said integrating capacitor means for changing the output voltage of said voltage regulator.

5. A circuit for driving a lamp as defined in claim 4 wherein said power supply further comprises a power oscillator means having a peak voltage proportional to the resistance of said field effect transistor means.

6. A circuit for driving a lamp as defined in claim 5 wherein said power oscillator means maintains the 60 Hertz input impedance of said power supply at a constant value and exclusively resistive and nonreactive.

7. A circuit for driving a lamp as defined in claim 1 further comprising power oscillator means for generating said output of said power supply and for maintaining a constant and exclusively resistive input impedance at a frequency lower than the frequency of said oscillator means.

8. A circuit for driving a lamp as defined in claim 1 wherein said power supply comprises:
    rectifier means having a rectifier output and return;
    power oscillator means for switching current from said rectifier means alternately between said switching means and said rectifier return in first and second oscillator states respectively, said oscillator means comprising:
        comparator amplifier means having positive feedback and further having a negative input connected to said rectifier output through a voltage divider network, said amplifier alternatively saturating at predetermined positive and negative voltages;
        a capacitor connected across said rectifier output and return;
        an inductor, having one of its ends connected to said rectifier output;
        transistor switching means connected between the other end of said inductor and said rectifier return, said transistor having its base connected to the output of said comparator amplifier.

9. A circuit for driving a lamp as defined in claim 8 wherein said predetermined positive saturation voltage corresponds to said first state and said predetermined negative saturation voltage corresponds to said second state.

10. A circuit for driving a lamp as defined in claims 8 or 9 further comprising an inverting amplifier connected between said output of said comparator amplifier means and said base.

11. A circuit for driving a lamp as defined in claims 8 or 9 wherein said positive and negative predetermined saturation voltages have identical magnitudes.

12. A circuit for driving a lamp as defined in claims 8 or 9 wherein said symmetry corrective means comprises means for varying a resistance in said voltage divider network.

13. A circuit for driving a lamp as defined in claim 12 wherein said corrective means comprises:
a field effect transistor means in said voltage divider network;
symmetry detector capacitor means for acquiring and maintaining an assymmetry voltage corresponding to said difference, said detector means connected to said lamp switching circuit means;
means furnishing said assymmetry voltage to the gate of said field effect transistor means.

14. A circuit for driving a lamp as defined in claims 8 or 9 further comprising shut-down protective means comprising:
means for sensing voltage at said lamp switching circuit means above a predetermined threshold voltage;
means responsive to said sensing means for applying a voltage to said base of said power oscillator transistor means to hold said oscillator transistor means on.

15. A circuit for driving a lamp as defined in claim 1 wherein said power supply comprises:
power oscillator means for switching current alternatively to said lamp switching circuit means and to ground in first and second oscillator states respectively;
a shut-down protective circuit comprising:
voltage sensing means for sensing voltage to said lamp switching circuit means above a threshold voltage;
means responsive to said voltage sensing means for holding said oscillator means in said second state.

16. A circuit for driving a lamp as defined in claim 15 wherein:
said holding means holds said oscillator means in said second state for a predetermined length of time only.

17. A circuit for driving a lamp as defined in claim 16 wherein said holding means includes an astabile multivibrator.

18. A circuit for driving a lamp as defined in claims 15, 16, or 17 wherein said voltage sensing means senses said output voltage.

19. A circuit for driving a lamp as defined in claims 15, 16, or 17, wherein said lamp switching circuit means comprises a switching transistor means, and said sensing means senses the voltage across said transistor means.

20. A symmetry regulated supply voltage feedback control loop comprising:
a voltage regulator means supplying an output voltage;
means responsive to a reference input for varying the magnitude of said output voltage;
a load connected to said voltage regulator means, said load comprising a switching circuit, said switching circuit having a first switching state and a second switching state, said switching circuit being alternately in said first switching state during a first time period and in said second switching state during a second time period, the proportion of said first time period to said second time period controlled by said output voltage;
symmetry detector means for generating a corrective signal at said reference input proportional to the difference between said first and second time periods.

21. A selective intensity lamp control circuit comprising:
a lamp;
means for storing magnetic energy connected across said lamp;
a power supply;
switching means connected between the parallel combination of said lamp and storing means and said power supply;
control means for temporarily turning said switching means off in response to current flowing through said parallel combination above a predetermined selectable current level; and,
regulating means for changing said predetermined level to counteract changes in the output of said power supply.

22. A control circuit as defined in claim 21 wherein:
said control means temporarily turns said switching means off in response to a voltage caused by said current through said switching device above a predetermined reference voltage corresponding to said predetermined current level.

23. A control circuit as defined in claim 22 wherein said regulating means maintains a substantially constant current flow through said lamp independently of fluctuations in the output of said power supply.

24. A control circuit as defined in claims 21 or 22 further comprising voltage limiting means for limiting said reference voltage to a predetermined maximum value.

* * * * *